(12) United States Patent
Ohashi et al.

(10) Patent No.: US 7,237,643 B2
(45) Date of Patent: Jul. 3, 2007

(54) PUMP UNIT AND WORKING VEHICLE

(76) Inventors: Ryota Ohashi, 18-1, Inadera 2-chome, Amagasak-shi, Hyogo (JP) 661-0981; Hironori Sumomozawa, 18-1, Inadera 2-chome, Amagasaki-shi, Hyogo (JP) 661-0981

( * ) Notice: Subject to any disclaimer, the term of this patent is extended or adjusted under 35 U.S.C. 154(b) by 0 days.

(21) Appl. No.: 11/169,015

(22) Filed: Jun. 29, 2005

(65) Prior Publication Data
US 2005/0236214 A1  Oct. 27, 2005

Related U.S. Application Data

(63) Continuation of application No. 10/403,020, filed on Apr. 1, 2003, now Pat. No. 6,988,580.

(30) Foreign Application Priority Data

Apr. 3, 2002  (JP) .............................. 2002-101100
Apr. 15, 2002 (JP) .............................. 2002-112128

(51) Int. Cl.
 *B60K 17/10* (2006.01)
(52) U.S. Cl. .................................................. 180/307
(58) Field of Classification Search ................ 180/305, 180/307, 308, 53.6, 53.8; 56/10.8, 11.7, 56/11.8; 74/424
See application file for complete search history.

(56) References Cited

U.S. PATENT DOCUMENTS

| | | | |
|---|---|---|---|
| 3,613,815 A | 10/1971 | Meylink et al. | |
| 4,119,169 A | 10/1978 | Hopkins | |
| 4,145,883 A | 3/1979 | Forster | |
| 4,159,749 A | 7/1979 | Boushek, Jr. | |
| 4,395,865 A | 8/1983 | Davis, Jr. et al. | |
| 4,413,698 A | 11/1983 | Conrad et al. | |
| 4,502,558 A * | 3/1985 | Mauri .................... | 180/14.3 |
| 4,579,183 A | 4/1986 | Irikura et al. | |
| 4,867,001 A | 9/1989 | Sasaki et al. | |
| 5,181,579 A | 1/1993 | Gilliem | |
| 5,560,447 A * | 10/1996 | Ishii et al. ................ | 180/242 |
| 5,809,756 A | 9/1998 | Scag et al. | |

(Continued)

FOREIGN PATENT DOCUMENTS

JP    08-104147    4/1996

(Continued)

*Primary Examiner*—Frank Vanaman
(74) *Attorney, Agent, or Firm*—Sterne, Kessler, Goldstein & Fox P.L.L.C.

(57) ABSTRACT

A pump unit for supply and discharge of hydraulic fluid into and from an actuator upon receiving driving power from a driving source is provided, in which said actuator is fluidly connected to said pump unit via a hydraulic circuit. The pump unit includes an input member operatively connected to the driving source, a first hydraulic pump body operatively connected to the input member, a pump case for accommodating the first hydraulic pump body and forming a hydraulic fluid sump, and a PTO unit accommodated within the pump case. The PTO unit includes a PTO shaft supported by the pump case so as to have an end extending outward from the pump case, and a clutch mechanism for selectively enabling and disabling transmission of driving power from the input member to the PTO shaft.

2 Claims, 30 Drawing Sheets

U.S. PATENT DOCUMENTS

| | | |
|---|---|---|
| 5,915,496 A | 6/1999 | Bednar et al. |
| 5,918,691 A * | 7/1999 | Ishii .......................... 180/6.48 |
| 6,125,954 A | 10/2000 | Oota et al. |
| 6,250,414 B1 | 6/2001 | Sato et al. |
| 6,276,468 B1 | 8/2001 | Essig et al. |
| 6,601,474 B2 | 8/2003 | Ishimaru et al. |
| 6,860,354 B2 * | 3/2005 | Hasegawa ................... 180/242 |

FOREIGN PATENT DOCUMENTS

| | | |
|---|---|---|
| JP | 2000-071790 | 3/2000 |
| JP | 2000-185569 | 7/2000 |
| JP | 2000-280771 | 10/2000 |
| JP | 2000-351330 | 12/2000 |
| JP | 2001-116104 | 4/2001 |

* cited by examiner

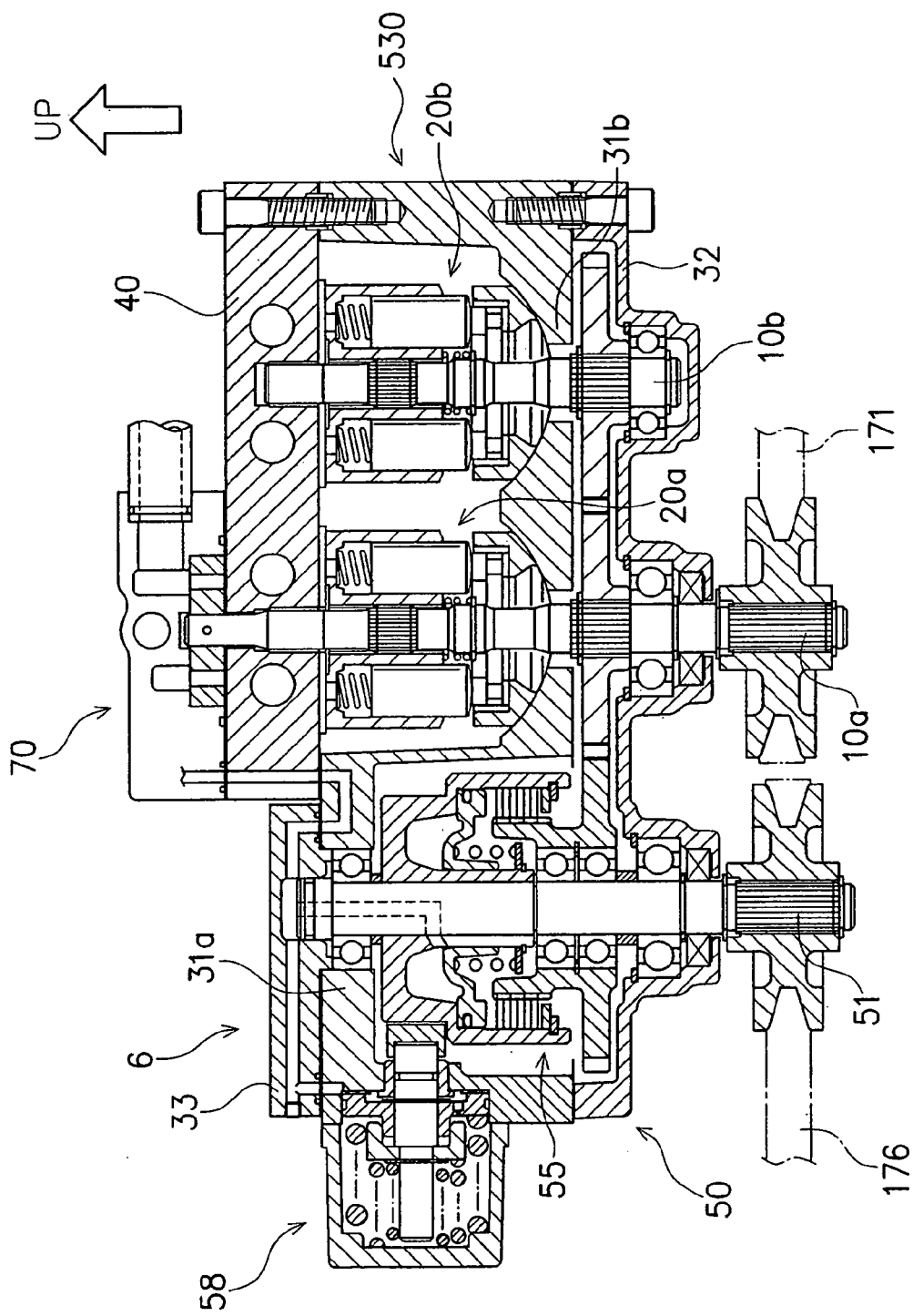

PUMP UNIT AND WORKING VEHICLE

CROSS REFERENCE TO RELATED APPLICATION

This application is a continuation of U.S. application Ser. No. 10/403,020, filed Apr. 1, 2003 now U.S. Pat. No. 6,988,580, which is incorporated in its entirety herein by reference.

BACKGROUND OF THE INVENTION

1. Field of the Invention

The present invention relates to a pump unit that is operatively connected to a driving source and fluidly connected to an actuator via a hydraulic circuit so as to be capable of outputting driving power with variable speed through the actuator.

2. Related Art

The hydraulic pump unit is used in various fields of applications, one of which is directed to a cooperative operation with the actuator which is arranged away from the hydraulic pump unit. In this application, the hydraulic pump unit and the actuator are connected to each other via a hydraulic circuit so as to together constitute a main transmission path for receiving driving power from a driving source and outputting the same with variable speed.

In some applications, a power transmission structure equipped with the hydraulic pump unit requires a sub transmission path in addition to the main transmission path. Such a requirement exists, for example, in a lawn mower, in which power from a common driving source is divided and output into a running-power transmission path and a PTO power transmission path.

Now, the description will be made for the arrangement where a hydraulic motor unit is used as the actuator.

U.S. Pat No. 4,395,865 (hereinafter referred to '865 patent), U.S. Pat. No. 5,809,756 (hereinafter referred to '756 patent) and other prior art references disclose a lawn mower that includes a PTO power transmission path for receiving power from an engine and outputting the same to a mower as well as a running power transmission path that is made up of a hydraulic pump unit operatively connected to the engine and a hydraulic motor unit located away from the hydraulic pump unit so as to drive driving wheels.

Specifically, the lawn mower in the '865 patent provides the engine as a common driving source with first and second output shafts, which are respectively and operatively connected to the hydraulic pump unit and a mower unit. That is, in the lawn mower of the '865 patent, the running power transmission path is entirely separated from the PTO power transmission path. However, this entire separation of the running power transmission path and the PTO power transmission path necessitates a large number of parts for separately forming these transmission paths and a large space for accommodating these separate transmission paths. Also, the power transmission structure with two separate power transmission paths requires independent control for enabling and disabling the transmission of power in each transmission path. In order to achieve this control, in the lawn mower of the '865 patent, an electromagnetic clutch for enabling and disabling the transmission of power is placed in each transmission path. This electromagnetic clutch has however poor durability, and therefore may result in loss in reliability to each transmission path.

On the other hand, the lawn mower of the '756 patent provides the engine with a common output shaft, on which a driving pulley and a mower pulley are supported, so that power can be divided into the running power transmission path and the PTO power transmission shaft through this common output shaft. In order to achieve this arrangement, the common output shaft must be lengthened, which results in a larger load applied thereon. The '756 patent is also silent as to how to enable and disable the transmission of power in each transmission path.

The present invention has been conceived in consideration of the above prior arts. Accordingly, it is an object of the present invention to provide a pump unit that is operatively connected to a driving source and fluidly connected to an actuator via a hydraulic circuit so as to output driving power with variable speed through the actuator, and has a simplified structure enabling dividing driving power from the driving source into a sub transmission path as well as into a main transmission path, which the pump unit constitutes in cooperation with the actuator.

It is another object of the present invention to provide a working vehicle having a simplified structure, which includes a PTO power transmission path extending from a drive source to a working unit for land treatment such as a mower unit (hereinafter simply referred to as "working unit"), as well as a running power transmission path that is made up of a hydraulic pump unit for receiving driving power from a driving source, and a hydraulic motor unit located away from the hydraulic pump unit and fluidly connected thereto.

SUMMARY OF THE INVENTION

According to one aspect of the present invention, there is provided a pump unit for supply and discharge of hydraulic fluid into and from an actuator upon receiving driving power from a driving source, in which the actuator is fluidly connected to the pump unit via a hydraulic circuit. The pump unit includes an input member operatively connected to the driving source, a first hydraulic pump body operatively connected to the input member, a pump case for accommodating the first hydraulic pump body and forming a hydraulic fluid sump, and a PTO unit accommodated within the pump case. The PTO unit includes a PTO shaft supported by the pump case so as to have an end extending outward from the pump case, and a clutch mechanism for selectively enabling and disabling transmission of driving power from the input member to the PTO shaft.

With the thus arranged pump unit, it is possible to easily make up a reduced-size sub transmission path that can be controlled independently of the main transmission path, while making up the main transmission path in cooperation with the actuator fluidly connected to the pump unit. Also, since the operation to enable and disable the power transmission is performed by the clutch mechanism, the sub transmission path can have an improved durability.

Preferably, the pump case has an opening, and the pump unit further includes a center section connected to the pump case so as to close the opening, while supporting the first hydraulic pump body on one of opposite sides thereof, in which the hydraulic circuit is disposed in the center section.

The pump unit may further include a charge pump unit for sucking hydraulic fluid from the hydraulic fluid sump and discharging the same to the hydraulic circuit, in which the charge pump unit is operatively connected to the input member and supported on the opposite side of the center section.

With the thus arranged pump unit, the charge pump unit can be used as a fluid supply source for supplying pressurized hydraulic fluid to the hydraulic circuit, thereby achieving easy supply of pressurized hydraulic fluid to the hydraulic circuit.

The pump unit may further include a second hydraulic pump body operatively connected to the input member, in which the opening of the pump case is adapted to enable the first and second hydraulic pump bodies to pass therethrough, and the center section is connected to the pump case so as to close the opening, while supporting the first and second hydraulic pump bodies.

The PTO unit may further include a brake mechanism for releasing and applying braking force away from and to the PTO shaft in association with the operation of the clutch mechanism to enable and disable the transmission of driving power from the input member to the PTO shaft. With this arrangement, it is possible to effectively prevent the PTO shaft from continuing to rotate by inertia when the power transmission to the PTO shaft has been disabled.

The PTO unit may further include a brake mechanism for releasing and applying braking force away from and to the PTO shaft in association with the operation of the clutch mechanism to enable and disable the transmission of driving power from the input member to the PTO shaft, in which the brake mechanism and the clutch mechanism are of hydraulic type that is operated by hydraulic fluid discharged by the charge pump unit. With this arrangement, the charge pump unit can be used as a fluid supply source for supplying pressurized hydraulic fluid to the hydraulic clutch mechanism and the hydraulic brake mechanism, thereby achieving a simplified structure of a hydraulic circuit of each of the hydraulic clutch mechanism and the hydraulic brake mechanism.

The pump unit may further include an input shaft acting as the input member, and a first pump shaft for driving the first hydraulic pump body.

In the above pump unit, the PTO shaft may be arranged coaxially with the input shaft.

With the thus arranged pump unit, the sub transmission path from the driving source to the working unit can be formed substantially in a linear fashion, thereby achieving a simplified structure of the sub transmission path and occupation of less space by the pump unit.

According to another aspect of the present invention, there is provided a working vehicle that includes a vehicle frame, a first pair of laterally disposed wheels supported by the vehicle frame, a second pair of laterally disposed wheels supported by the vehicle frame so as to be located away from the first pair of laterally disposed wheels in a fore and aft direction of the working vehicle, a working unit supported by the vehicle frame, a driving source supported by the vehicle frame, first and second motor units respectively and operatively connected to the first pair of laterally disposed wheels, and a pump unit supported by the vehicle frame so as to be operatively connected to the driving source. The pump unit is arranged to supply and discharge hydraulic fluid into and from each of the first and second motor units, and take out driving power of the driving source and output the same as driving power for the working unit. The pump unit includes an input member operatively connected to the driving source, a first hydraulic pump body operatively connected to the input member, a pump case for accommodating the first hydraulic pump body, and a PTO unit accommodated within the pump case. The PTO unit includes a PTO shaft supported by the pump case so as to have an end extending outward from the pump case, and a clutch mechanism for selectively enabling and disabling transmission of driving power from the input member to the PTO shaft.

With the thus arranged working vehicle, it is possible to easily make up a reduced-size sub transmission path that can be controlled independently of the main transmission path, while making up the main transmission path in cooperation with the actuator fluidly connected to the pump unit. Also, since the operation to enable and disable the power transmission is performed by the clutch mechanism, the sub transmission path can have an improved durability.

The working vehicle may further include a charge pump unit that is operatively connected to the input member. With the thus arranged working vehicle, the charge pump unit can be used as a fluid supply source for supplying pressurized hydraulic fluid to the hydraulic circuit, thereby achieving easy supply of pressurized hydraulic fluid to the hydraulic circuit.

The pump unit may further include a second hydraulic pump body operatively connected to the input member.

The PTO unit may further include a brake mechanism for releasing and applying braking force away from and to the PTO shaft in association with the operation of the clutch mechanism to enable and disable the transmission of driving power from the input member to the PTO shaft.

With the thus arranged working vehicle, it is possible to effectively prevent the PTO shaft from continuing to rotate by inertia when the power transmission to the PTO shaft has been disabled.

The driving source may be supported on the vehicle frame in vibration free manner, while the pump unit is fixedly supported on the vehicle frame, and the driving source is operatively connected to the input member via vibration-absorbing transmission means.

The driving source may be supported on the vehicle frame in vibration free manner, while the pump unit is integrally connected to the driving source.

The pump unit may further include an input shaft acting as the input member, and a first pump shaft operatively connected to the input shaft and arranged to drive the first hydraulic pump body.

The PTO shaft may be arranged coaxially with the input shaft. With this arrangement, the sub transmission path from the driving source to the working unit can be formed substantially in a linear fashion, thereby achieving a simplified structure of the sub transmission path and occupation of less space by the pump unit.

In the thus arranged working vehicle, the PTO shaft may have an axis, which is located at the same position as an axis of the input shaft in a vehicle width direction, and is arranged substantially orthogonal to the axis of the input shaft.

The pump unit may further include a first pump shaft that acts as the input member and is arranged to drive the first hydraulic pump body. The first pump shaft may be arranged substantially parallel to the PTO shaft. As an alternative thereto, the first pump shaft may be arranged substantially orthogonal to the PTO shaft.

BRIEF DESCRIPTION OF THE DRAWINGS

The above, and other objects, features and advantages of the present invention will become apparent from the detailed description thereof in conjunction with the accompanying drawings wherein.

FIG. 26 is a side view in vertical cross section of the pump unit according to the sixth embodiment.

DETAILED DESCRIPTION OF THE PREFERRED EMBODIMENT

First Embodiment

The description will be made for the first embodiment of the present invention with reference to the accompanied drawings.

The pump unit according to the present invention is fluidly connected to an actuator via a hydraulic circuit for a cooperative operation, in which the actuator is driven by the effect of pressurized hydraulic fluid in the hydraulic circuit. This embodiment will be hereinafter described by taking for example the case where a hydraulic motor unit is used as the actuator.

Figure 1A:
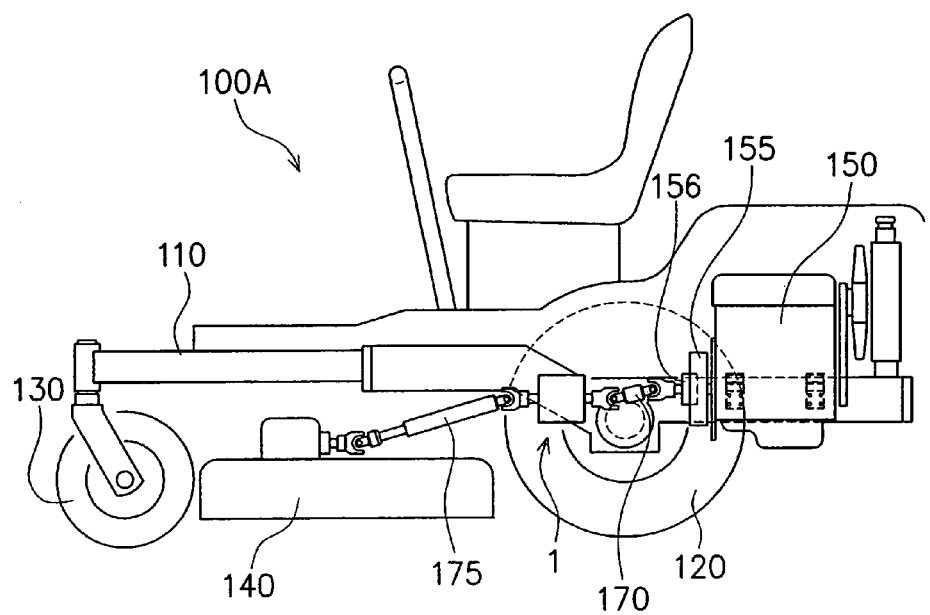
FIGS. 1A and 1B are respectively a side view and a plan view of a lawn mower, to which a pump unit of a first embodiment of the present invention has been applied.
Figure 1B:
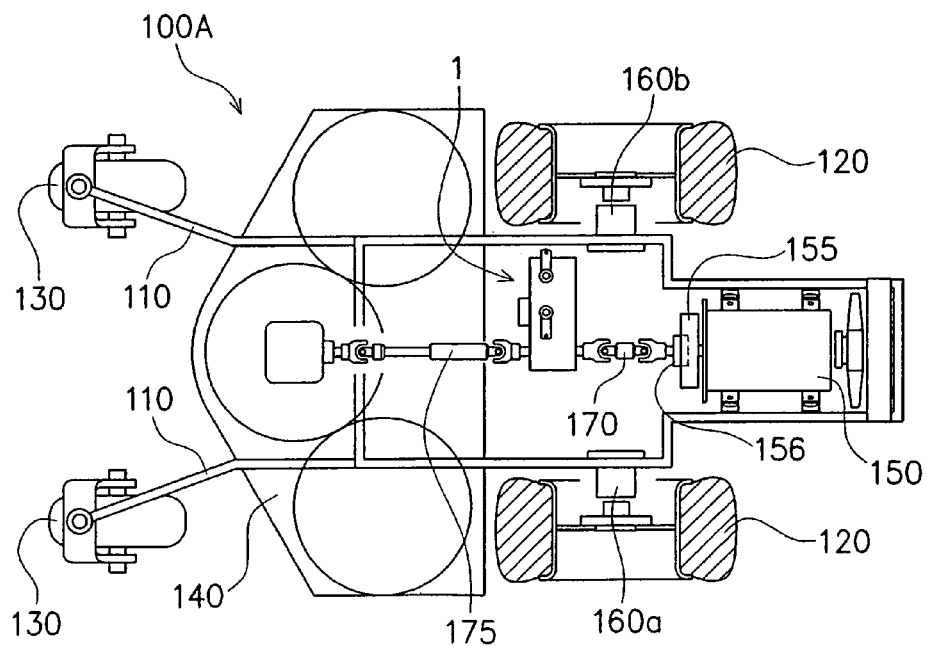
Figure 2:
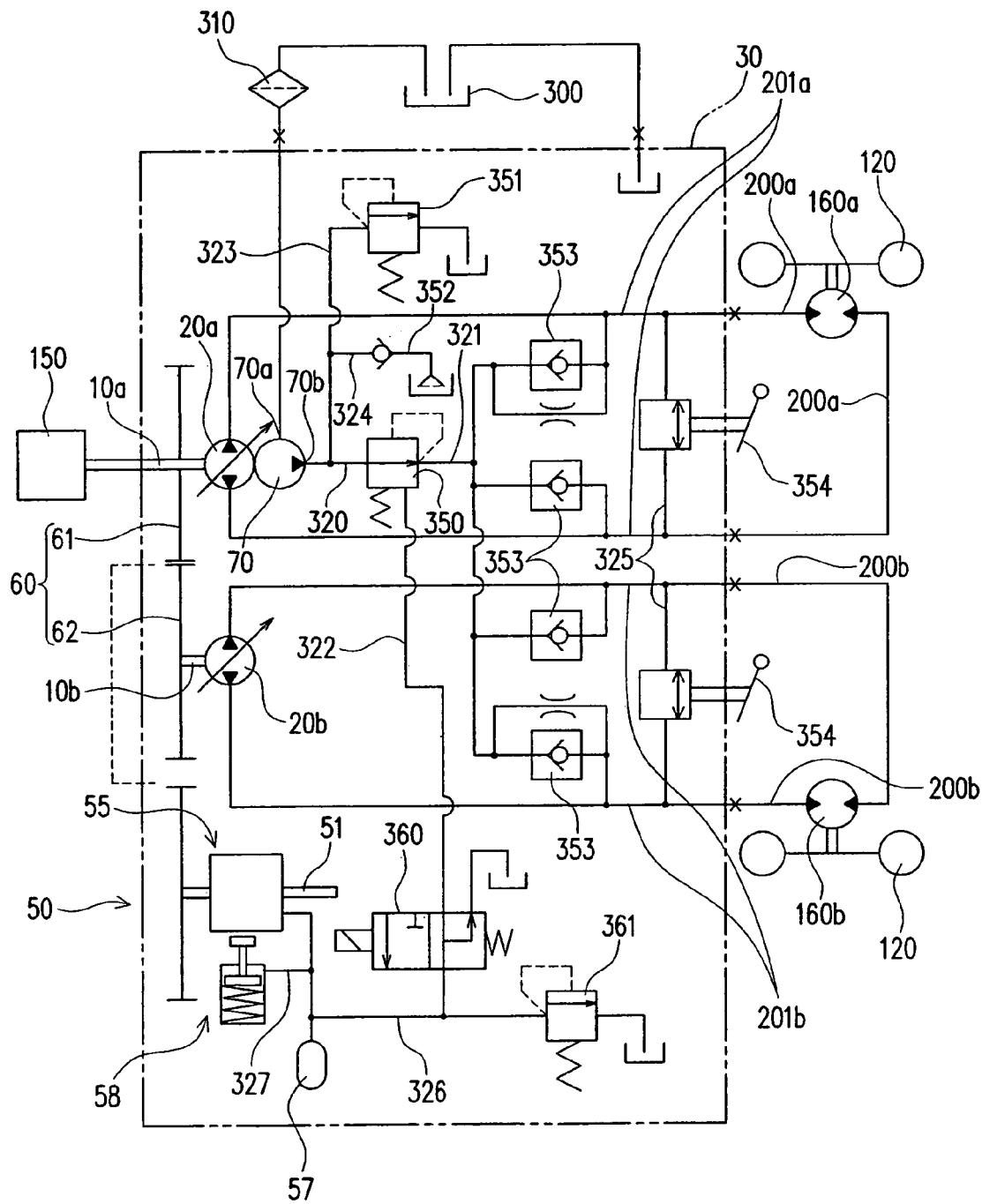
FIG. 2 is a hydraulic circuit diagram of the pump unit according to the first embodiment.
Figure 3:
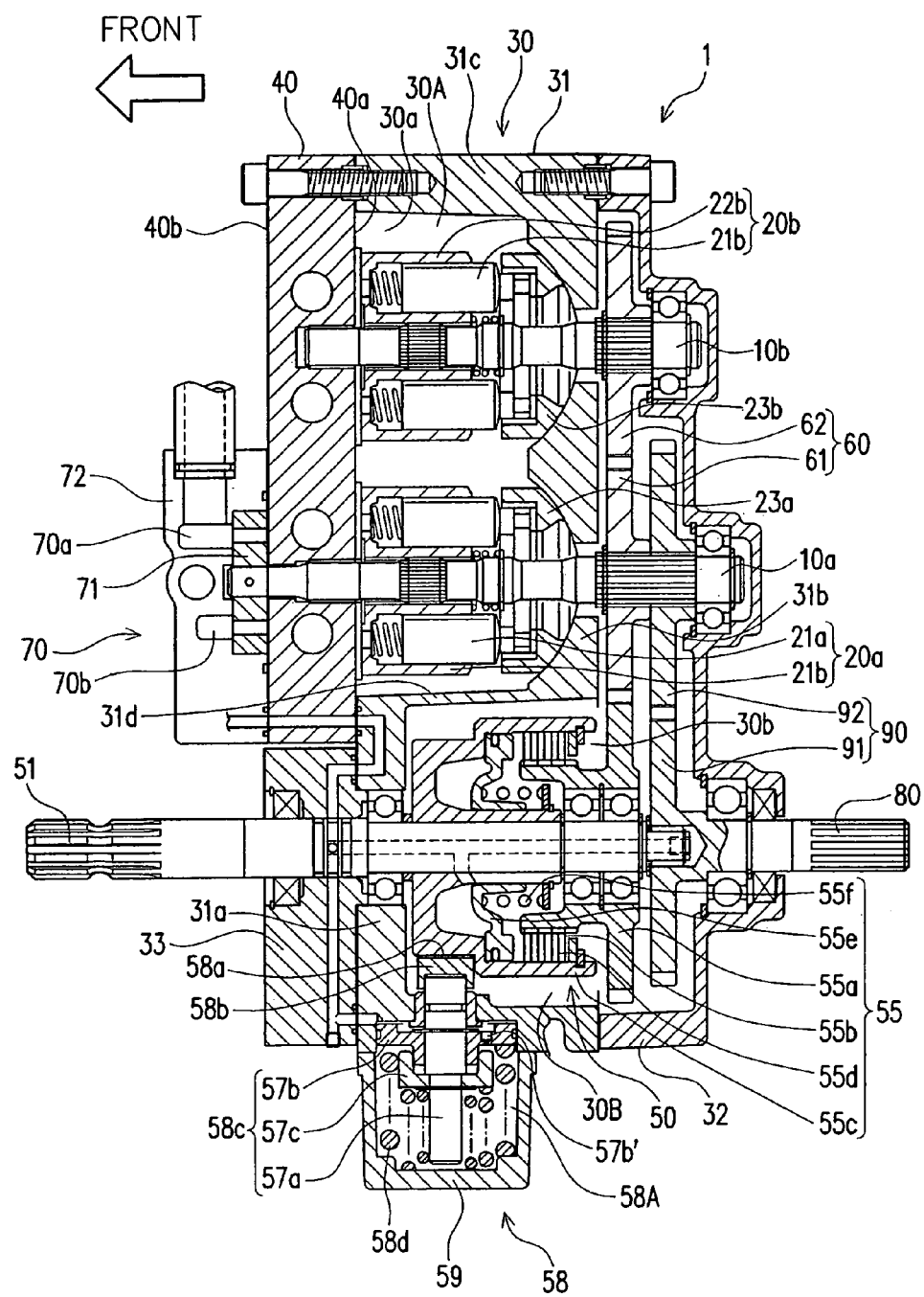
FIG. 3 is a plan view in horizontal cross section of the pump unit according to the first embodiment.
Figure 4:
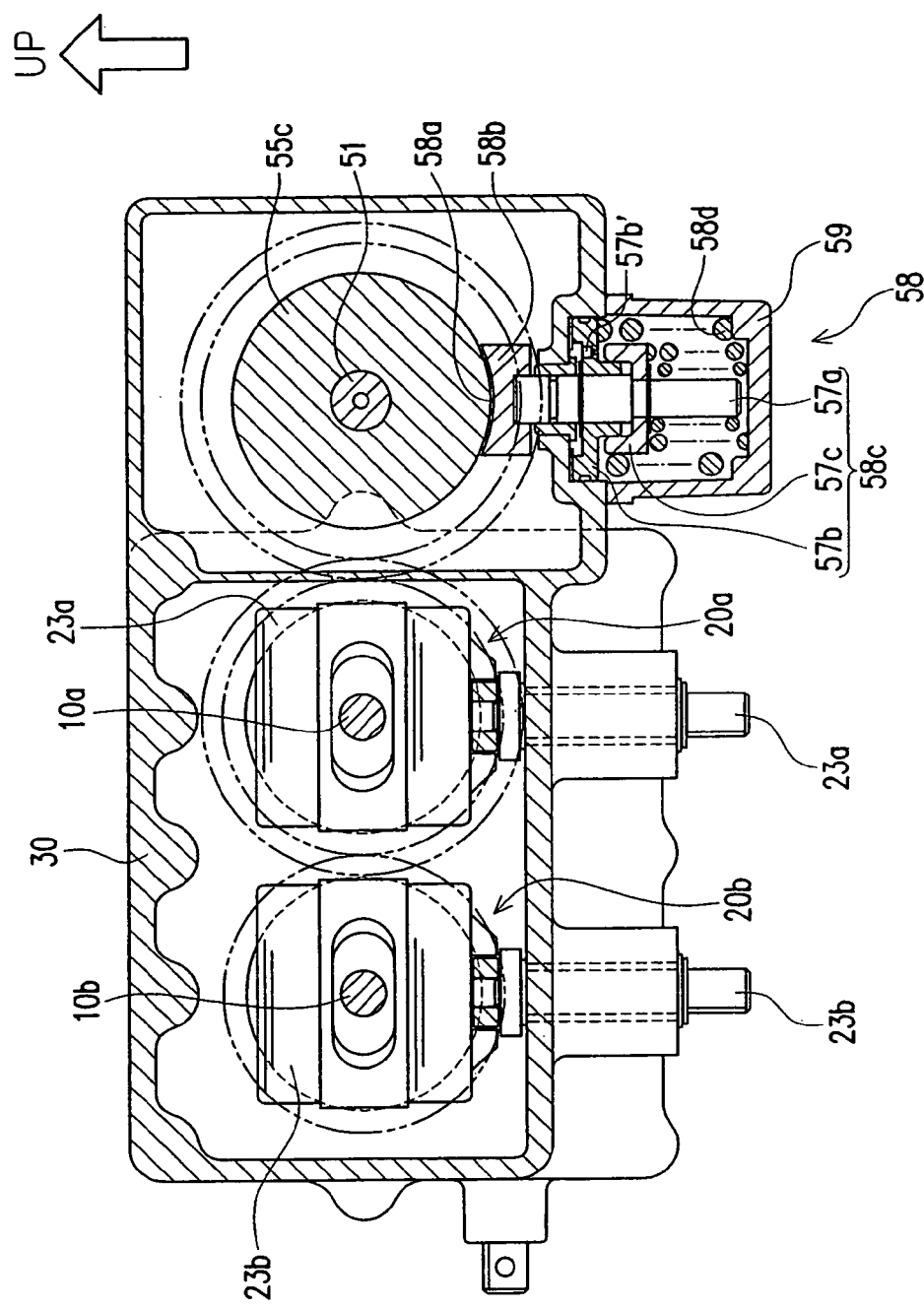
FIG. 4 is a side view in vertical cross section of the pump unit of FIG. 3.

FIGS. 1A and 1B are respectively a side view and a plan view of a lawn mower 100A, to which a pump unit 1 of this embodiment has been applied. FIG. 2 is a hydraulic circuit diagram of the pump unit 1. FIGS. 3 and 4 are respectively a plan view in horizontal cross section and a side view in vertical cross section of the pump unit according to this embodiment.

Now, the description will be made for the lawn mower 100A.

As illustrated in FIGS. 1A and 1B, the lawn mower 100A includes a vehicle frame 110, a pair of laterally disposed driving wheels (rear wheels in this embodiment) 120 supported by the vehicle frame 110 so as to be located closer to a first side of the lawn mower (a rear side in this embodiment), a pair of laterally disposed casters 130 supported by the vehicle frame 110 so as to be located closer to a second side of the lawn mower (a front side in this embodiment), a working unit (mower unit in this embodiment) 140 supported by the vehicle frame 110 so as to be located between the pair of laterally disposed driving wheels 120 and the pair of laterally disposed casters 130, a driving source 150 supported-by the vehicle frame 110 so as to be located opposite to the working unit 140 with the driving wheels 120 therebetween relative to a fore and aft direction of the vehicle (that is, located closer to the rear side in this embodiment), and first and second hydraulic motor units 160a, 160b having motor shafts respectively and operatively connected to the pair of laterally disposed driving wheels 120, as well as the pump unit 1 of this embodiment.

As illustrated in FIGS. 1 and 2, the pump unit of this embodiment is fluidly connected via a hydraulic circuit to the hydraulic motor units 160a, 160b, which are located away from the pump unit 1, and is designed to receive driving power from the driving source 150 and let the working units 160a, 160b drive the driving wheels 120 by utilizing the hydraulic effect of the hydraulic circuit. That is, the pump unit 1 constitutes the running power transmission path as a main transmission path in cooperation with the hydraulic motor units 160a, 160b.

The pump unit 1 is also designed to be capable of taking off power from the main transmission path and outputting the same as driving power for the working unit 140. That is, the pump unit also constitutes a part of the PTO power transmission path.

More specifically, as illustrated in FIGS. 3 and 4, the pump unit 1 includes an input shaft 80 operatively connected to the driving source 150, a first pump shaft 10a operatively connected to the input shaft 80, a first hydraulic pump body 20a to be driven by the first pump shaft 10a, a second pump shaft 10b operatively connected to the input shaft 80 or the first pump shaft 10a, a second hydraulic pump body 20b to be driven by the second pump shaft 10b, a pump case 30 for accommodating the first hydraulic pump body 20a and the second hydraulic pump body 20b and having a first opening 30a through which the first and second hydraulic pump bodies 20a, 20b pass into and out of the pump case 30, a center section 40 connected to the pump case 30 so as to close the first opening 30a while supporting the first and second hydraulic pump bodies 20a, 20b, and a PTO unit 50 accommodated within the pump case 30. The pump case 30 forms a hydraulic fluid sump.

As illustrated in FIG. 2, the first hydraulic pump body 20a and the second hydraulic pump body 20b are respectively and fluidly connected to the first hydraulic motor unit 160a and the second hydraulic motor unit 160b via the hydraulic circuit (a pair of hydraulic lines 200a and a pair of hydraulic lines 200b in this embodiment).

The pump unit 1 of this embodiment is designed to have the pair of hydraulic pump bodies 20a, 20b which respectively correspond to the pair of laterally disposed hydraulic motor units 160a, 160b so that the pair of driving wheels 120 can be driven at rotational speeds independently of each other. That is, the pump unit 1 of this embodiment is designed so as to have the first hydraulic pump body 20a and the second hydraulic pump body 20b arranged respectively corresponding to the first hydraulic motor unit 160a and the second hydraulic motor unit 160b. However, the present invention is not necessarily limited to this arrangement. The arrangement with only a single hydraulic pump body or with three or more hydraulic pump bodies accommodated within the pump case 30 also falls within the scope of the present invention. For example, where the pump unit 1 is provided with only a single hydraulic pump body, the single hydraulic pump body is fluidly connected to the pair of laterally disposed hydraulic motor units 160a, 160b via a hydraulic circuit having a fluid dividing means such as a flow dividing valve.

At least one of the hydraulic pump bodies 20a, 20b and the hydraulic motor units 160a, 160b, which are respectively fluidly connected to each other, is of a variable displacement type that varies the suction/discharge rates by the operation of an output adjustment member. Accordingly, output with variable speed can be produced through motor shafts of the hydraulic motor units by controlling the slanting angle of the output adjustment member. In this embodiment, the hydraulic pump bodies 20a, 20b are of the variable displacement type, while the hydraulic motor units 160a, 160b are of a fixed displacement type.

As best illustrated in FIG. 3, the input shaft 80 has an upstream end with respect to the power transmission direction (a rear end in this embodiment) supported by the pump case 30 so as to extend outwards through the pump case 30 and operatively connected to the driving source 150 via a flywheel 155. The flywheel 155 may be provided with a damper 156 (see FIG. 1), thereby enabling power to be transmitted from the driving source 150 to the input shaft 80, while limiting variation in angular speed of the output shaft of the driving source 150. As a result, durability of the hydraulic pump bodies 20a, 20b can be improved, hence achieving improved durability of the hydraulic motor units 160a, 160b thanks to limited pulsation of hydraulic fluid discharged from the hydraulic pump bodies 20a, 20b.

In this embodiment, as illustrated in FIG. 1, the driving source 150 is supported on the vehicle frame 110 in vibration free manner, while the pump case 30 is fixedly supported on the vehicle frame 110. This arrangement causes difference in vibration between the driving source 150 and the pump case 30. In order to absorb this vibration difference, in this embodiment, the driving source 150 is operatively connected to the input shaft 80 by a vibration-absorbing transmission means. In this embodiment, as illustrated in FIG. 1, transmission shaft 170 having universal joints at the opposite ends is used as the vibration-absorbing transmission means. Instead, a belt transmission mechanism may be employed.

As illustrated in FIG. 3, the first pump shaft 10a is supported on the pump case 30 so as to be arranged substantially parallel to the input shaft 80, and operatively connected to the input shaft 80 via a power transmission mechanism 90. In this embodiment, the power transmission mechanism 90 includes a drive-side gear 91 disposed non-rotatably relative to the input shaft 80 and a driven-side gear 92 disposed non-rotatably relative to the first pump shaft 10a so as to be in meshed engagement with the drive-side gear 91.

The first hydraulic pump body 20a includes a piston unit 21a that performs a rotational movement around the axis of the first pump shaft 10a by the rotation of the first pump shaft 10a and a reciprocal movement in association with the rotational movement, a cylinder block 22a that supports the piston unit 312, allowing it to freely reciprocate, and is rotatably and slidably supported on the center section 40 so as to be in communication with the pair of hydraulic lines 200a, and an output adjusting member 23a (a combination of a movable swash plate and an operational shaft in this embodiment), which regulates the stroke length of the piston unit 21a according to the slanting angle so as to vary the suction/discharge rates of the piston unit 21a. In this embodiment, although the hydraulic pump bodies 20a, 20b are of an axial piston type, it is possible to be of a radial piston type.

The second pump shaft 10b is supported on the pump case 30 so as to be arranged substantially parallel to the first pump shaft 10a. The second pump shaft 10b is operatively connected to the input shaft 80 or the first pump shaft 10a via a transmission mechanism 60 accommodated within the pump case 30 so as to be rotated in synchronization with the first pump shaft 10a. In this embodiment, the transmission mechanism 60 includes a first gear 61 supported relatively non-rotatably on the first pump shaft 10a, and a second gear 62 having the same pitch as the first gear 61 and relatively non-rotatably supported on the second pump shaft 10b so as to be in meshed engagement with the first gear 61.

The second hydraulic pump body 20b has substantially the same structure as that of the first hydraulic pump body 20a except that the second hydraulic pump body 20b is driven by the second pump shaft 10b. Accordingly, the detailed description of the second hydraulic pump body 20b will be omitted.

As best illustrated in FIG. 3, the PTO unit 50 includes a PTO shaft 51 and a hydraulic clutch mechanism 55. In this embodiment, the PTO shaft 51 is aligned coaxially with the input shaft 80 and supported on the pump case 30 so as to have an outer end. In this embodiment, the end of the PTO shaft 51 extends forwards in the fore and aft direction of the vehicle.

More specifically, the PTO shaft 51 is aligned coaxially with the input shaft 80 in operative connection to the input shaft 80 via the drive-side gear 91, the driven-side gear 92, the first pump shaft 10a, the first gear 61 and the hydraulic clutch mechanism 55, so that driving power from the input shaft 80 is selectively input to the PTO shaft 51 by the hydraulic clutch mechanism 55. The outer end of the PTO shaft 51 is operatively connected to an input part of the working unit 140 via a vibration-absorbing transmission means. In this embodiment, transmission shaft 175 having universal joints at the opposite ends is used as the vibration-absorbing transmission means, as illustrated in FIG. 1.

The coaxial arrangement of the input shaft 80 and the PTO shaft 51 in the pump unit 1 of this embodiment produces the following effects:

As illustrated in FIG. 1B, the coaxial arrangement of the input shaft 80 and the PTO shaft 51 can achieve the sub transmission path extending from the driving source 150 to the working unit 140 in a linear fashion, and hence occupation of less space.

Where the connections between the driving source 150 and the input shaft 80 and between the PTO shaft 51 and the working unit 140 are respectively made by the transmission shafts 170, 175, the coaxial arrangement of the input shaft 80 and the PTO shaft 51 can reduce the load applied to connection areas between these shafts, hence achieving improved durability of the connection areas and prevention of noises and vibrations. Specifically, the output shaft of the driving source 150 and the input part of the working unit 140 are preferably located substantially along the longitudinal center axis of the vehicle in terms of the weight balance (see FIG. 1B). In this preferable arrangement, when the input shaft 80 and the PTO shaft 51 are offset to either lateral side from the longitudinal center axis of the vehicle, the transmission shaft 170 between the driving source 150 and the input shaft 80, or the transmission shaft 175 between the PTO shaft 51 and the working unit 140 must be tilted at an angle relative to the longitudinal center axis. In order to achieve this orientation of the transmission shaft, the universal joints at the opposite ends thereof are required to forcibly change the rotational axis of driving power to be transmitted. This causes a large load on these universal joints.

On the contrary, in this embodiment, as described above, the input shaft 80 is aligned coaxially with the PTO shaft 51. This arrangement allows the transmission shafts 170, 175 to be aligned parallel to the longitudinal center axis of the vehicle. As a result, it is possible to reduce the load applied on the universal joints provided on the transmission shafts 170, 175.

Further, the PTO shaft 51 is vertically offset from the input part of the working unit 140 in consideration of the lifting height of the working unit 140. Specifically, when the working unit 140 is at an operational position (a position in contact with a land), the transmission shaft 175 is tilted forwardly downwardly (see FIG. 1A), while at an inoperative position (a withdrawal position), the transmission shaft 175 is horizontally oriented or is tilted forwardly upwardly (not shown).

The universal joints can permit variation of tilting angle of the transmission shaft 175 to some extent. However, when the PTO shaft 51 and the input part of the working unit 140 are offset from each other in the lateral direction of the vehicle, lateral bending as well as vertical vending are caused in the universal joints. As a result, "three-dimensional bending" occurs in the universal joints. On the contrary, as described above, the coaxial arrangement of the PTO shaft 51 and the input shaft 80 can omit the possibility to cause lateral bending and hence achieve the reduction of the load applied on the universal joints.

The hydraulic clutch mechanism 55 is designed to selectively enable and disable power transmission from the input shaft 80 to the PTO shaft 51 by the hydraulic effect. In this embodiment, as best illustrated in FIG. 3, the hydraulic clutch mechanism 55 includes a drive-side member 55a relatively rotatably and axially non-slidably supported on the PTO shaft 51, while being operatively connected to the input shaft 80, a drive-side friction plate 55b relatively non-rotatably and axially slidably supported on the drive-side member 55a, a driven-side member 55c relatively non-rotatably supported on the PTO shaft 51, a driven-side friction plate 55d relatively non-ratably supported on the driven-side member 55c in such a manner as to be axially slidable within a certain area, a clutch pressing member 55e for bringing the driven-side friction plate 55d into frictional engagement with the drive-side friction plate 55b upon receiving the hydraulic effect, and a clutch biasing member 55f for biasing the clutch pressing member 55e in a direction away from the drive-side friction plate 55b and the driven-side friction plate 55d.

The thus arranged hydraulic clutch mechanism 55 transmits power from the input shaft 80 to the PTO shaft 51 via the drive-side member 55a and the driven-side member 55c when the clutch pressing member 55e has brought both the friction plates 55b, 55d into frictional engagement with each other by the hydraulic effect, and disables power transmission from the input shaft 80 to the PTO shaft 51 when the hydraulic effect is not applied.

The pump case 30 is designed to be capable of accommodating the first and second hydraulic pump bodies 20a, 20b, and the hydraulic clutch mechanism 55 of the PTO unit 50. More specifically, the pump case 30 includes a hollowed case body 31 having first and second end walls 31a, 31b respectively located closer to the first and second sides along the longitudinal axis of the vehicle (front and rear sides in this embodiment), and a peripheral wall 31c extending between peripheral edges of the first and second end walls 31a, 31b.

The first end wall 31a has on a first lateral side in the vehicle width direction a first opening 30a, through which the first and second hydraulic pump bodies 20a, 20b can pass into and out of the case body 31, while the second end wall 31b has on a second side in the vehicle width direction a second opening 30b, through which the PTO unit 50 can pass into and out of the case body 31.

With the above arrangement, the case body 31 defines a hydraulic-pump-body-accommodation space 30A located closer to the first lateral side of the vehicle in communication with the first opening 30a, and a hydraulic-clutch-mechanism-accommodation space 30B located closer to the second lateral side of the vehicle in communication with the second opening 30b.

Preferably, the case body 31 has a partition wall 31d for dividing the hydraulic-pump-body-accommodation space 30A from the hydraulic-clutch-mechanism-accommodation space 30B so as to effectively prevent metallic dust or the like generated by the frictional engagement between the friction plates in the hydraulic clutch mechanism 55 from directly flowing into the hydraulic-pump-body-accommodation space 30A.

The pump case 30 further includes a lid member 32 connected to the case body 31 so as to cover substantially the entire surface of the second end wall 31b located on the second side of the fore and aft direction of the vehicle, thereby closing the second opening 30b. The lid member 32 is connected to the second end wall 31b, leaving an accommodation space between the lid member 32 and the second end wall 31b of the case body 31. This accommodation space is to accommodate the transmission mechanism 90 for operative connection between the input shaft 80 and the first pump shaft 10a (the drive-side gear 91 and the driven-side gear 92 in this embodiment) enabling them to be operated in association with each other, and the transmission mechanism 60 for operative connection between the first pump shaft 10a and the second pump shaft 10b (the first and second gears 61, 62 in this embodiment) enabling them to be operated in association with each other. Preferably, filters or oil seals (not shown) are respectively provided in clearances between the inner circumferences of first- and second-pump-shaft-insertion holes provided in the second end wall 31b and the outer circumferences of the pump shafts 10a, 10b so that metallic dust or the like can be prevented from flowing into the hydraulic-pump-body-accommodation space 30A.

The first opening 30a is closed by the center section 40. That is, the center section 40 is connected to the first end wall 31a so as to close the first opening 30a, while supporting the first and second hydraulic pump bodies 20a, 20b on a surface 40a facing the case body 31.

Preferably, the first pump shaft 10a has a downstream end with respect to the power transmission direction, which extends outwards through the center section 40, and a charge pump unit 70 is mounted on a surface 40b opposite to the hydraulic-pump-support surface 40a so as to be driven through the downstream end of the first pump shaft 10a. As used throughout the description, the directional term "upstream" and "downstream" are relative to the driving-power transmission direction.

In order to drive the charge pump unit 70, the second pump shaft 10b may be extended through the center section 40 to have an outside end, through which the charge pump unit 70 is driven. Alternatively, both the first pump shaft 10a and the second pump shaft 10b are extended through the center section 40 to respectively have outside ends, so that the charge pump unit 70 is driven through either one of the outside ends, while a cooling fan (not shown) is driven through the residual one of the outside ends. The charge pump unit 70 is used as a fluid-supply source for supplying pressurized charge fluid to the hydraulic circuit between the first and second hydraulic pump bodies 20a, 20b and the hydraulic motor units 160a, 160b, as well as a fluid-supply source for supplying operating fluid for the hydraulic clutch mechanism 55 in the PTO unit 50.

Preferably, the pump case 30 includes a seal plate 33 to be connected to the first end wall 31a. The seal plate 33 acts as a sealing means for liquid-tightly sealing a bearing hole for the PCT shaft 51 formed in the first end wall 31a, and forms a part of the hydraulic circuit for fluid connection between the charge pump unit 70 and the hydraulic clutch mechanism 55. The pump case 30 is thus liquid-tightly sealed by the respective parts so as to be capable of storing hydraulic fluid in the inner space.

Further, the PTO unit 50 preferably includes a hydraulic brake mechanism 58 operable in association with clutching action of the hydraulic clutch mechanism 55 so as to be capable of effectively preventing the PTO shaft 51 from continuing to rotate by inertia of the working unit 140 connected thereto, when the hydraulic clutch mechanism 55 has disabled the power transmission.

The hydraulic brake mechanism 58 includes a brake disc 58a (an outer circumference of the driven-side member 55c of the hydraulic clutch mechanism 55 in this embodiment) non-rotatable relative to the PTO shaft 51, a brake shoe 58b disposed so as to be capable of being frictionally engaged with the brake disc 58a, a brake pressing member 58c having a distal end supporting the brake shoe 58b and a proximal end axially slidably supported on a cylinder chamber 58A provided in the pump case 30, and a brake biasing member 58d for biasing the brake pressing member 58c so as to bring the brake shoe 58b into frictional engagement with the brake disc 58a.

The thus arranged hydraulic brake mechanism 58 is of a negative brake system. That is, when the brake pressing member 58c is not subjected to the hydraulic effect, the brake shoe 58b is held in frictional engagement with the brake disc 58a by the biasing force of the brake biasing member 58d, thereby applying braking force to the PTO shaft 51. On the other hand, when the brake pressing member 58c is subjected to the hydraulic effect, the brake pressing member 58c is moved away from the brake shoe 58b against the biasing force of the brake biasing member 58d, thereby applying no braking force to the PTO shaft 51.

More preferably, the cylinder chamber 58A is formed by the peripheral wall 31c of the case body 31 and a cover 59 connected thereto. That is, the cylinder chamber 58A, which requires to provide liquid-tight capability, is formed not in the case body 31 but in the cover 59. Whereby, it is not necessary to increase machining precision of the case body 31, and hence it is possible to relatively easily form the case body 31 by casting.

The application of the hydraulic effect to the brake pressing member 58c is made in association with the application of the hydraulic effect to clutch pressing member 55e of the hydraulic clutch mechanism 55. That is, when the hydraulic clutch mechanism 55 is brought into "engaging state" by hydraulic pressure applied to the clutch pressing member 55e, the hydraulic brake mechanism is brought into "breaking-force releasing state" since hydraulic pressure is also applied to the brake pressing member 58c. On the other hand, when hydraulic pressure is not applied to the clutch pressing member 55e and therefore the hydraulic clutch mechanism is brought into "disengaging state", the hydraulic brake mechanism 58 is brought into "breaking-force applying state" since hydraulic pressure is not applied also to the brake pressing member 58c.

Specifically, as illustrated in FIG. 2, the hydraulic brake mechanism 58 and the hydraulic clutch mechanism 55 are controlled by a common hydraulic source (the charge pump unit 70 in this embodiment) so as to be operated in association with each other.

Now, the description will be made for the hydraulic circuit of the pump unit 1 with reference to FIGS. 2 and 3.

The charge pump unit 70 has an inlet port 70a connected to an optional outside tank 300 (see FIG. 2) or to the pump case 30, via a filter 310 (see FIG. 2), and an outlet port 70b connected to a main pressurized-fluid line 320. The main pressurized-fluid line 320 is divided into a charge line 321 and an operating fluid line 322 at a pressure reducing valve 350 for charge pressure setting. More specifically, the main pressurized-fluid line 320 and the charge line 321 are respectively connected to the upstream and downstream sides of the pressure reducing valve 350 so that surplus hydraulic fluid resulting from the pressure reducing operation of the pressure reducing valve 350 flows into the operating fluid line 322.

Connected to the main pressurized-fluid line 320 are a pressure setting line 323 with a first relief valve 351 placed therein and a suction line 324 with a check valve 352 placed therein. The suction line 324 is provided to prevent occurrence of negative pressure in a hydraulic circuit between the hydraulic pump bodies 20 and the hydraulic motor units 160 (the pair of hydraulic lines 200a and the pair of hydraulic lines 200b in this embodiment) in the event of emergency or the like.

The charge line 321 is communicated respectively with the pair of hydraulic lines 200a and the pair of hydraulic lines 200b via check valves 353. More specifically, the center section 40 has a pair of hydraulic passages 201a that respectively form parts of the pair of hydraulic lines 200a, and a pair of hydraulic passages 201b that respectively form parts of the pair of hydraulic lines 200b, in which the charge line 321 is communicated with the pair of hydraulic passages 201a and the hydraulic passages 201b via the check valves 353 (see FIG. 2).

Preferably, each of the pair of hydraulic passages 201a and each the pair of hydraulic passages 201b respectively have ends opening to the outside through the same side of an peripheral wall of the center section 40 to respectively form fluid connection ports for connection with the first and second hydraulic motor units 160a, 160b.

Further, the center section 40 has bypass lines 325 for communication between the pair of hydraulic passages 201a (i.e., between the pair of hydraulic lines 200a) and communication between hydraulic passages 201b (i.e., between the pair of hydraulic lines 200b). Switching members 354 for communication and shutoff between the pair of hydraulic passages 201a and between the pair of hydraulic passages 201b are placed in the bypass lines 325 in such a manner as to be operable from the outside. The switching members 354 are used to force the pair of hydraulic lines 200a into communication with each other and the pair of hydraulic lines 200b into communication with each other, thereby allowing the motor shafts of the hydraulic motor units 160a, 160b to freely rotate, in the event of failure of the pump unit or the like, where the vehicle must be forcibly moved.

The operating fluid line 322 is communicated via a switching valve 360 with a clutch line 326, which is in turn communicated with a brake line 327. Accordingly, the switching valve 360 is controllable to supply pressurized hydraulic fluid and shut off the supply of the same from the operating fluid line 322 to the clutch line 326 and the brake line 327, that is, to the hydraulic clutch mechanism 55 and the hydraulic brake mechanism 58 in association with each other.

Second relief valve 361 for pressure setting is placed in the clutch line 326 so as to set the maximum hydraulic pressure in each of the clutch line 326 and the brake line 327. The downstream side of the second relief valve 361 is communicated with the pump case 30.

The pressure reducing valve 350, the check valve 352, the first relief valve 351, the switching valve 360 and the second relief valve 361 are mounted in, for example, a charge pump case 72 of the charge pump unit 70.

More preferably, the hydraulic brake mechanism 58 is provided with an accumulator means 57 for absorbing switching shock caused when the hydraulic clutch mechanism 55 is switched from the power shutoff state to the power transmission state (see FIG. 2). Specifically, the brake pressing member 58c is provided with a rod 57a having a proximal end located within the cylinder chamber 58A and a distal end on which the brake shoe 58b is supported, a pressure receiving plate 57b axially slidably supported on the rod 57a and arranged so as to divide the cylinder chamber 58A into a pressurized-fluid actuation chamber and a biasing-member accommodation chamber, and a follow plate 57c axially non-movably supported on the rod 57a so as to be located within the biasing-member accommodation chamber.

The pressure receiving plate 57b has an orifice 57b' for communication between the pressurized-fluid actuation chamber and the biasing-member accommodation chamber. The orifice 57b' is closed by the follow plate 57c when it has been pressed by a predetermined stroke upon receiving the effect of pressurized hydraulic fluid.

The thus provided accumulator means 57 can produce the following effects:

When the switching valve 360 is held at the pressurized-fluid supply position so as to bring the hydraulic clutch mechanism 55 into the "engaging state", while bringing the hydraulic brake mechanism 58 into the "breaking-force releasing state", pressurized hydraulic fluid is supplied into the clutch line 326 and the brake line 327. In an initial stage in which pressurized hydraulic fluid has started to be supplied into the pressurized-fluid actuation chamber via the brake line 327, pressurized hydraulic fluid leaks through the orifice 57b'. This leakage allows the hydraulic pressure of the clutch line 326 and the brake line 327 to relatively gradually increase. Accordingly, relatively gentle clutch engagement of the hydraulic clutch mechanism 55 is achieved. Then, the pressure receiving plate 57b is pressed through pressurized hydraulic fluid, thereby closing the orifice 57b'. Accordingly, the hydraulic pressure of the clutch line 326 and the brake line 327 is increased to a set value of the second relief valve 361.

Thus, in this embodiment, hydraulic pressure in the clutch line 326 can be gradually increased until the orifice 57b' is closed by the pressure receiving plate 57b after it is pressed by a predetermined stroke. Accordingly, it is possible to prevent abrupt clutch engagement of the hydraulic clutch mechanism 55, and hence wear-out and damages of the respective parts.

In addition to the effects as described above, the thus arranged pump unit 1 can produce the following effects:

By the pump unit 1, which is so arranged that pressurized hydraulic fluid can be supplied into the hydraulic motor units 160a, 160b by driving power from the driving source 150, and driving power from the driving source 150 is taken out by the PTO shaft 51 and output therefrom, the main transmission path and the sub transmission path that can be controlled independently of each other can be easily formed.

The above described arrangement, which makes the hydraulic clutch mechanism 55 accommodated within the pump case 30 enable and disable the power transmission in the sub transmission path, contributes to an improved durability as compared with a conventional arrangement, which makes an electromagnetic clutch perform the same function.

Further, the above described arrangement, in which the supply of pressurized hydraulic fluid to the hydraulic clutch mechanism 55 is made by the charge pump unit 70 connected to the pump case 30 and driven by the first pump shaft 10a, can contribute to a shortened and pressurized-fluid supply circuit.

Figure 5:
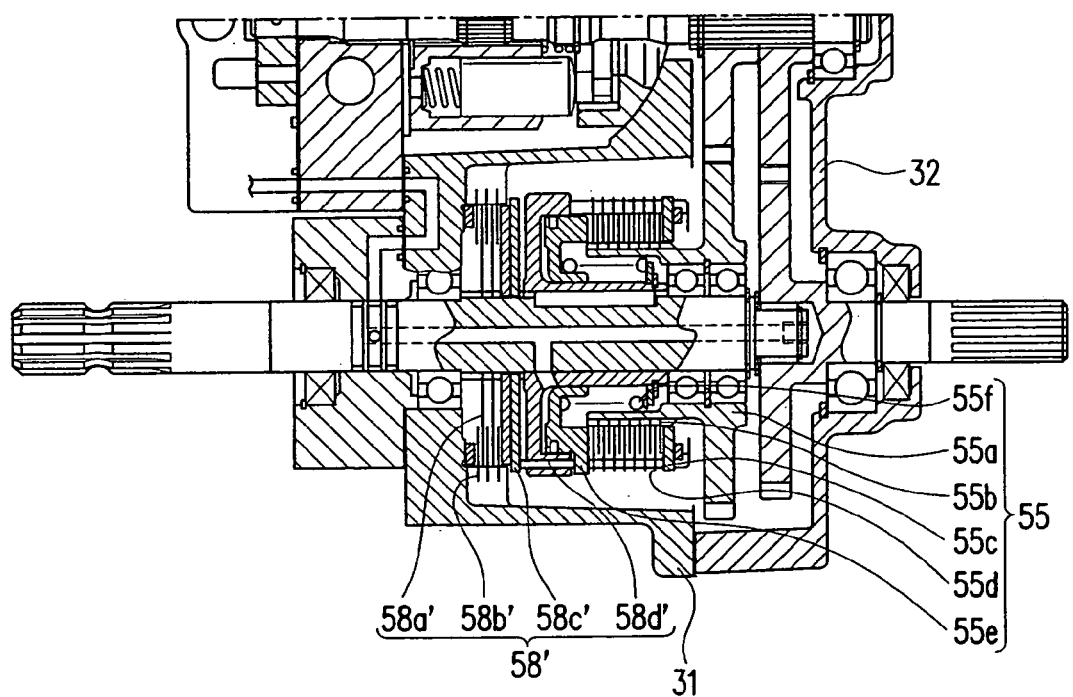
FIG. 5 is a plan view of the pump unit having a hydraulic brake mechanism of another embodiment with a part in horizontal cross section.

It is a matter of course that the respective constitutional elements of the pump unit 1 are not necessarily limited to those in this embodiment, but can be subjected to various modifications or replacement with others. For example, in place of the hydraulic brake mechanism 58, a hydraulic brake mechanism 58' as illustrated in FIG. 5 can be used. The hydraulic brake mechanism 58' includes a friction brake plate 58a' relatively non-rotatably and axially slidably supported on the PTO shaft 51, a fixed friction plate 58b' fixed to the case body 31, and a brake pressing member 58c' for pressing both the friction plates 58a', 58 into contact with each other, in which the brake pressing member 58c' is designed to be operated in association with the clutch pressing member 55e via a connection member 58d'.

That is, when the clutch pressing member 55e is pressed by the hydraulic effect so as to bring the drive-side friction plate 55b into frictional engagement with the driven-side friction plate 55d, the brake pressing member 58c' is moved away from the friction brake plate 58a' and the fixed friction plate 58b' in association with the action of the clutch pressing member 55e. On the other hand, when the clutch pressing member 55e is moved away from the drive-side friction plate 55b and the driven-side friction plate 55d by the effect of the clutch biasing member 55f, the brake pressing member 58c' brings the friction brake plate 58a' into frictional engagement with the fixed friction plate 58b' in association with the action of the clutch pressing member 55e. With the arrangement using the thus constructed hydraulic brake mechanism 58', it is also possible to effectively prevent the PTO shaft 51 from continuing to rotate by inertia even after power to the PTO shaft 51 has been shut off.

Second Embodiment

Figure 6:
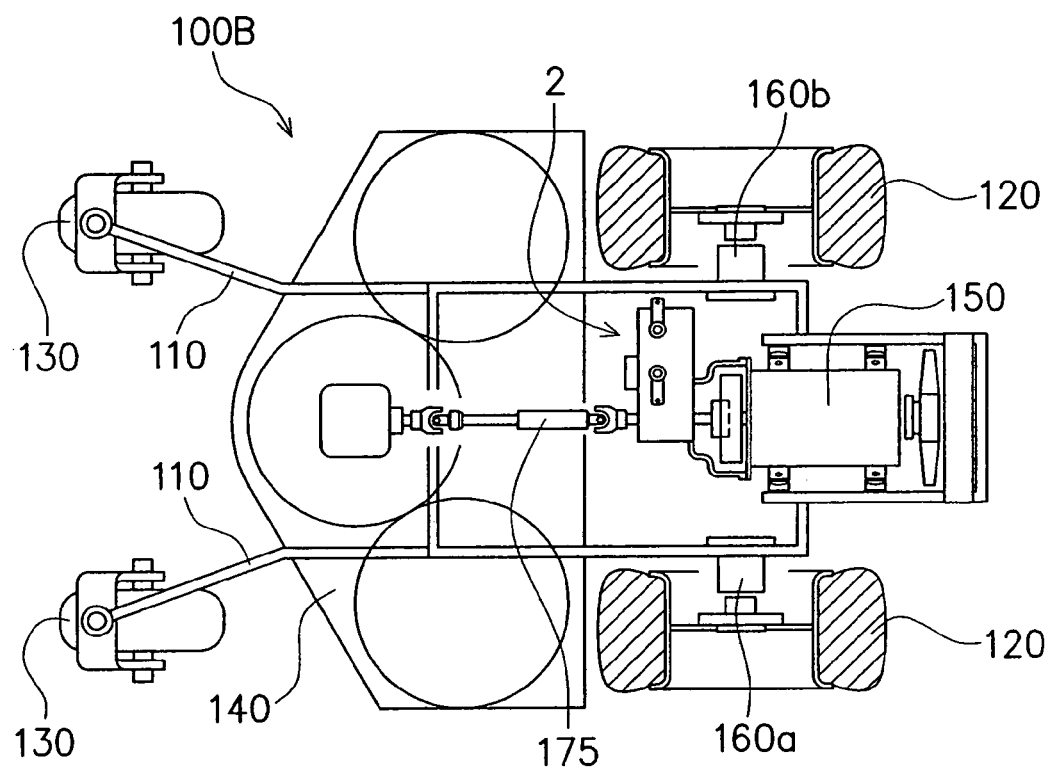
FIG. 6 is a plan view of the lawn mower, to which the pump unit of a second embodiment has been applied.
Figure 7:
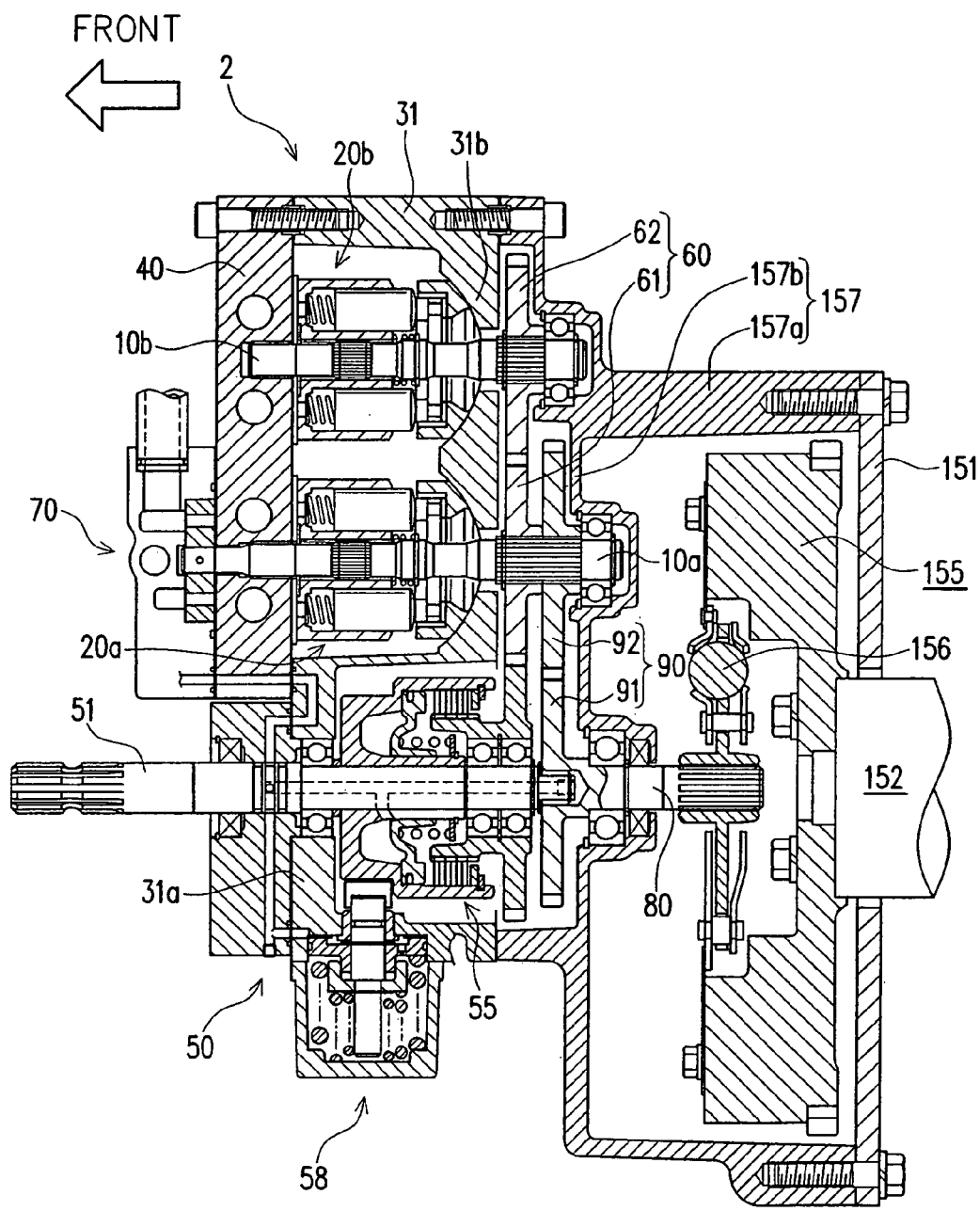
FIG. 7 is a plan view in horizontal cross section of the pump unit according to the second embodiment.

The description will be made for the second embodiment of the present invention with reference to the accompanied drawings. FIG. 6 is a plan view of a lawn mower 100B, to which a pump unit 2 of this embodiment has been applied, and FIG. 7 is a plan view in horizontal cross section of the pump unit 2 according to this embodiment. In the following description, corresponding or identical parts to those of the first embodiment have been given the same reference characters to omit a detailed description thereof.

While the pump unit 1 of the first embodiment is fixedly supported by the vehicle frame 110, the pump unit 2 of this embodiment is integrally connected to the driving source 150, as illustrated in FIGS. 6 and 7.

As illustrated in FIG. 7, the driving source 150 has a mount flange 151, to which a flywheel housing 157 is connected. The flywheel housing 157 has a peripheral wall 157a connected to the mount flange 151 and extending in the power transmission direction (in the fore and aft direction of the vehicle in this embodiment), and end wall 157b extending from a downstream end (a front end in this embodiment) of the peripheral wall 157a.

The case body 31 is connected to the flywheel housing 157 via the second end wall 31b in a free state relative to the vehicle frame 110. Preferably, the second end wall 31b of the case body 31 is connected to the end wall 157b of the flywheel housing 157, leaving a space therebetween. The space acts as an accommodation space for the first and second gears 61, 62, the drive-side gear 91 and the driven-side gear 92. In this embodiment, the end wall 157b of the flywheel housing 157 has a recess, which forms the accommodation space.

The input shaft 80 has an upstream end directly connected to an output part of the damper 156 in the flywheel 155, while being bearing-supported by the end wall 157b of the flywheel housing 157. Reference numeral 152 in FIG. 7 represents an output shaft of the driving source 150.

In addition to the effects in the first embodiment, the pump unit 2 produces the following effects:

The pump unit 2, which is integrally connected to the driving source 150 that is supported on the vehicle frame 110 in vibration free manner, does not cause vibration difference between the driving source 150 and the pump unit 2. As a result, it is possible to omit the vibration-absorbing transmission means between the driving source 150 and the pump unit 1, which is used in the first embodiment, thereby achieving reduced production cost. Also, the length between the driving source 150 and the pump unit 2 can be shortened. Since vibrations due to pulsation of hydraulic fluid cased by the actuation of the hydraulic pump bodies 20a, 20b are absorbed by utilizing a vibration absorption material interposed between the driving source 150 and the vehicle frame 110, vibrations are unlikely to transmit to the vehicle body, which contributes to improved driving environment.

Third Embodiment

Figure 8A:
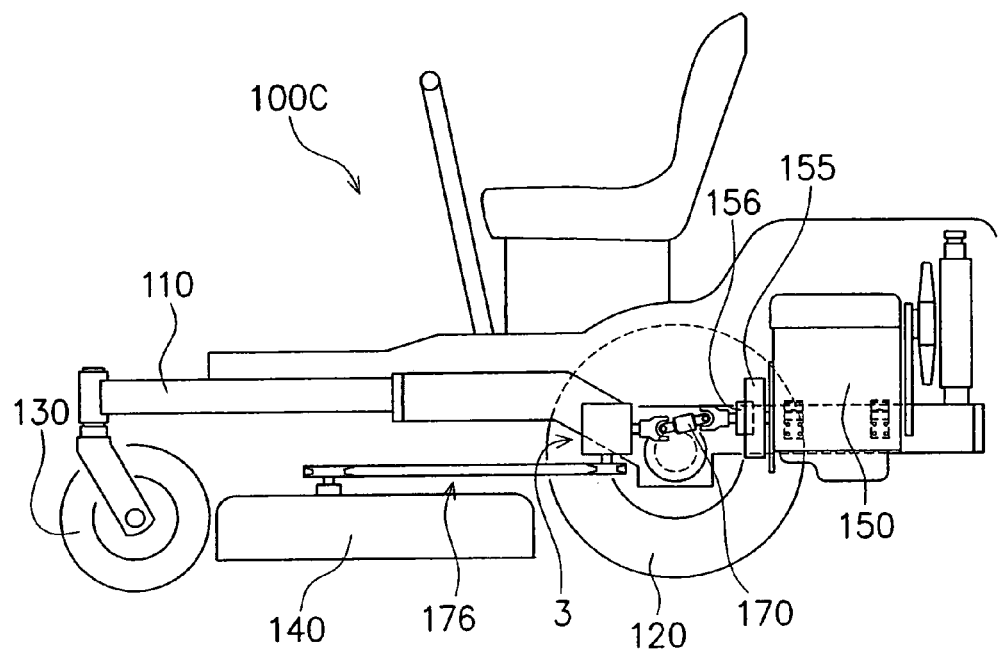
FIGS. 8A and 8B are a side view and a plan view of the lawn mower, to which the pump unit of a third embodiment has been applied.
Figure 8B:
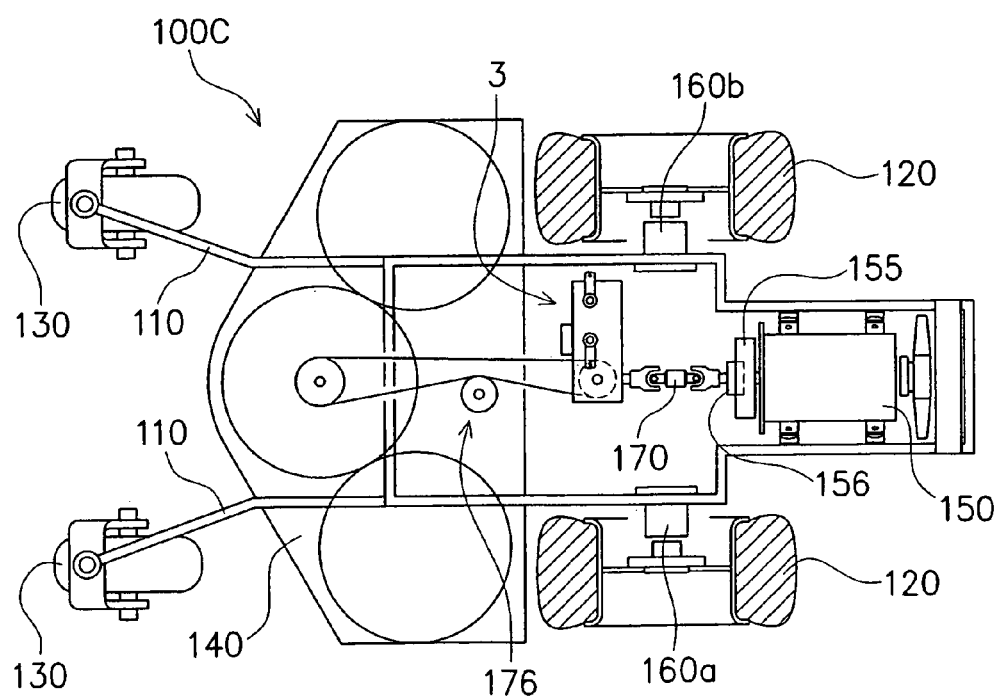
Figure 9:
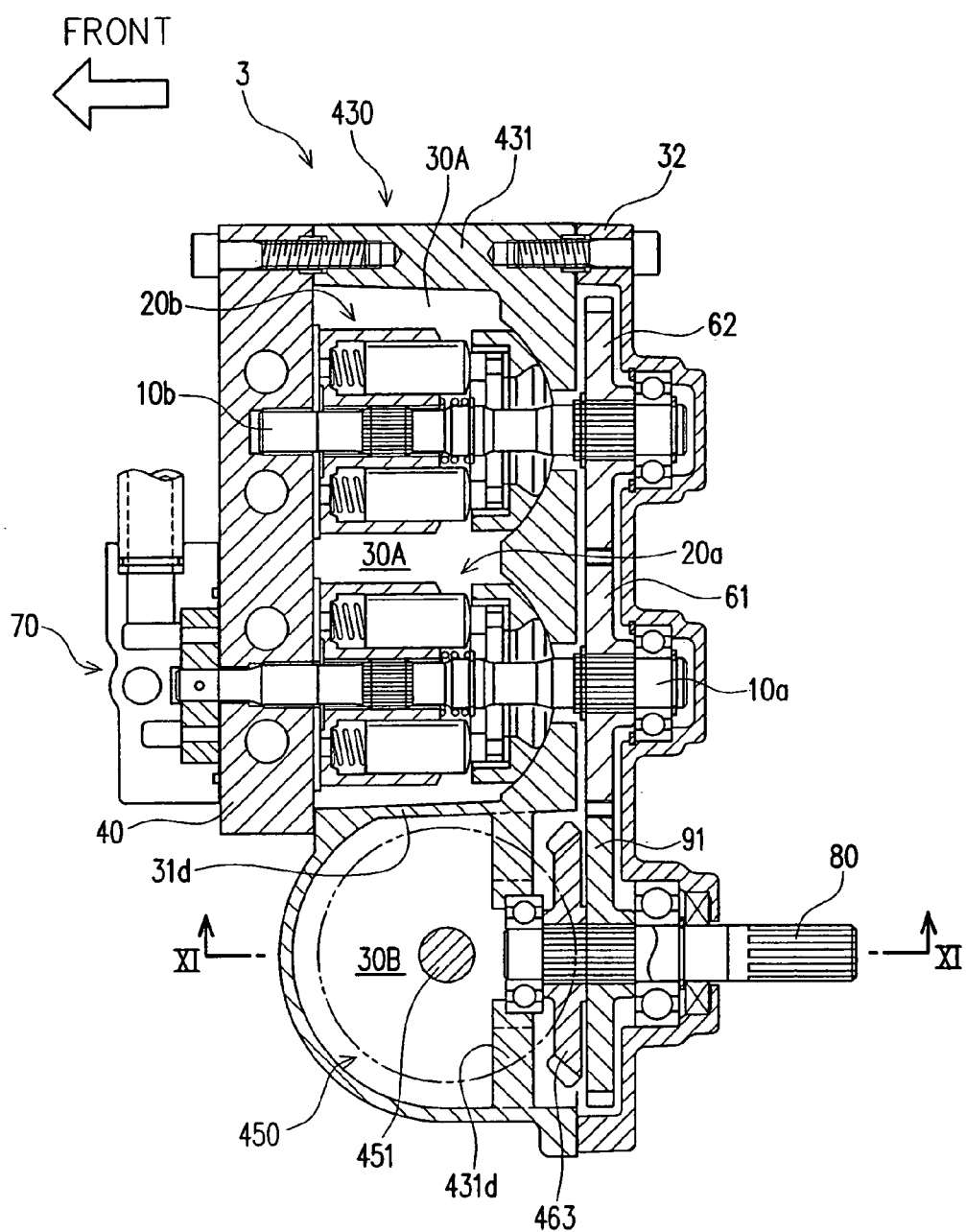
FIG. 9 is a plan view in horizontal cross section of the pump unit according to the third embodiment.
Figure 10:
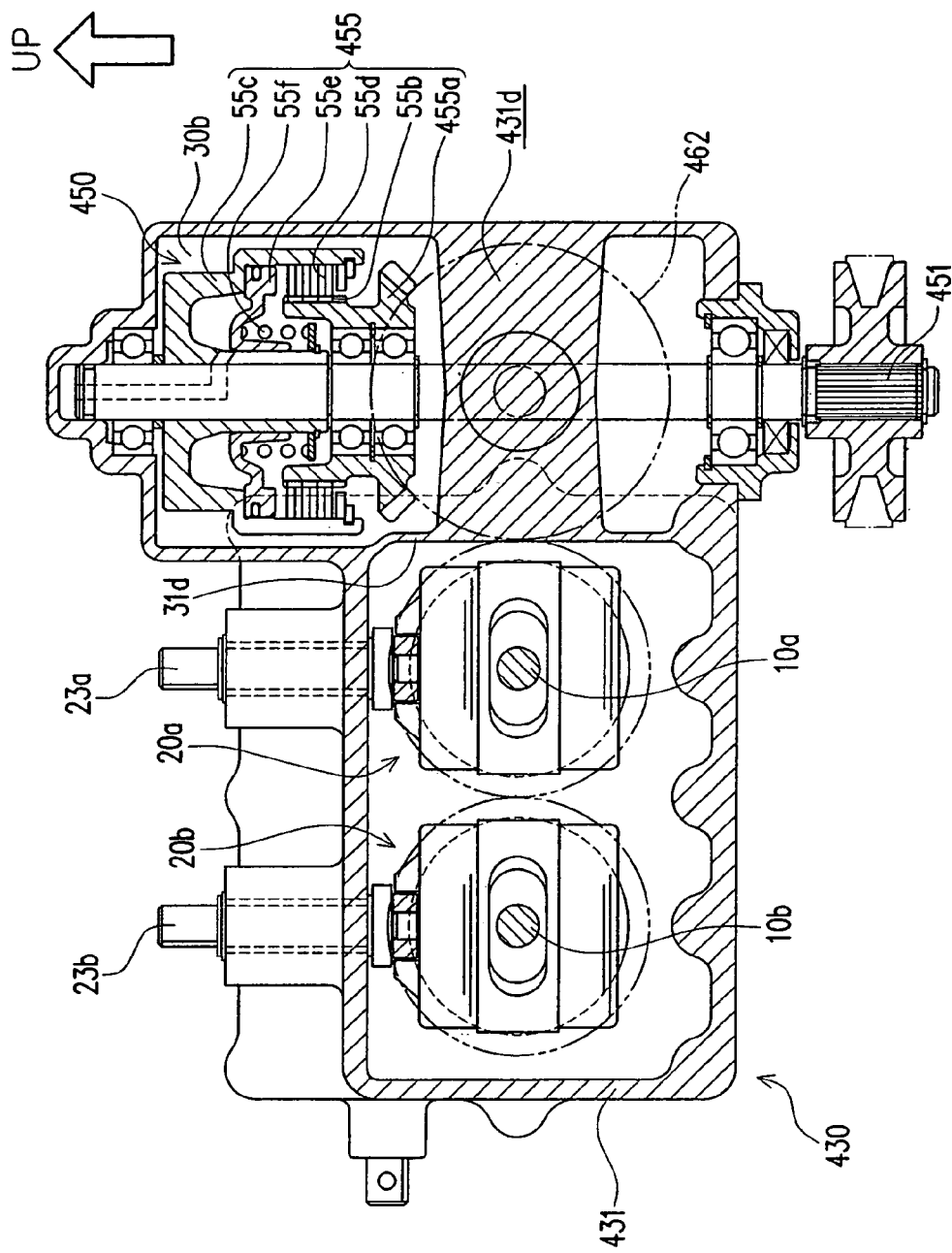
FIG. 10 is a side view in vertical cross section of the pump unit according to the third embodiment.
Figure 11:
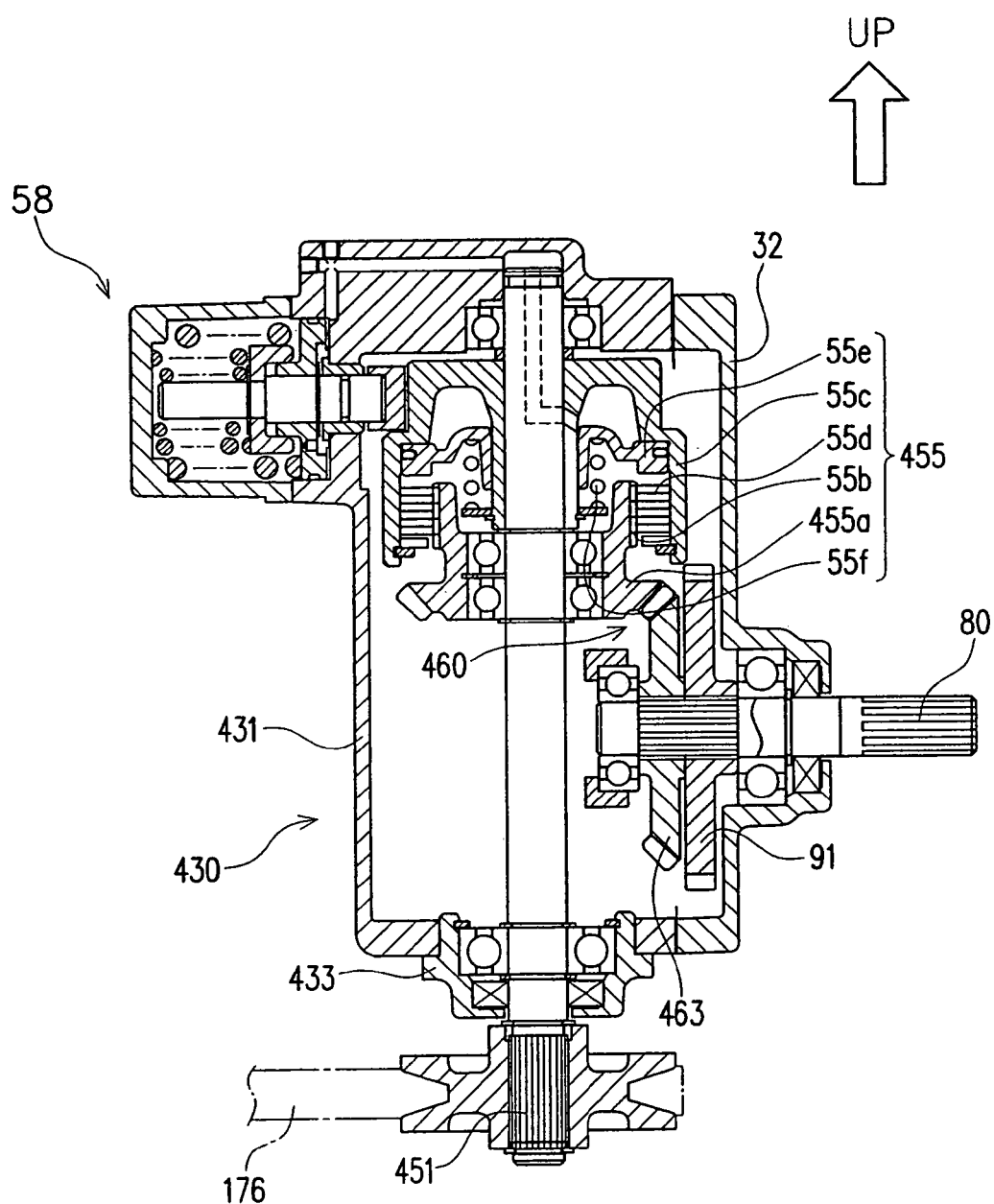
FIG. 11 is a cross section taken along the line XI—XI in FIG. 9.

The description will be made for the third embodiment of the present invention with reference to the accompanied drawings. FIGS. 8A and 8B are a side view and a plan view of a lawn mower 100C, to which a pump unit 3 of the third embodiment has been applied. FIGS. 9 and 10 are a plan view in horizontal cross section and a side view in vertical cross section of the pump unit 3 of the third embodiment. FIG. 11 is a cross section taken along the line XI—XI in FIG. 9. In the following description, corresponding or identical parts to those of the first or second embodiment have been given the same reference characters to omit a detailed description thereof.

In the pump unit 3 of this embodiment, the PTO shaft in the pump unit 1 of the first embodiment is modified so as to extend in the vertical direction. More specifically, the pump unit 3 of this embodiment includes a PTO unit 450 in place of the PTO unit 50, and a pump case 430 in place of the pump case 30.

The PTO unit 450 includes a PTO shaft 451 that extends vertically so as to be substantially orthogonal to the input shaft 80 arranged parallel to the longitudinal axis of the vehicle and that has the same axial position in the width direction of the vehicle as the input shaft 80, and a hydraulic clutch mechanism 455 for enabling and disabling power transmission from the input shaft 80 to the PTO shaft 451.

The PTO shaft 451 has a downstream end supported by the pump case 430 so as to extend vertically and outwardly through the pump case 430. In this embodiment, as best illustrated in FIGS. 10 and 11, the downstream end extends downwards from the pump case 430. The downstream end of the PTO shaft 451 is operatively connected to the input part of the working unit 140 via the vibration-absorbing transmission means in the same manner as the first embodiment. In this embodiment, as the vibration-absorbing transmission means, a belt transmission mechanism 176 is employed (see FIGS. 10 and 11).

The hydraulic clutch mechanism 455 includes a drive-side member 455a that is relatively rotatably and axially non-slidably supported on the PTO shaft 451, and operatively connected to the first pump shaft 10a. In this embodiment, as described above, the PTO shaft 451 is located orthogonal to the input shaft 80 so that the drive-side member 455a is operatively connected to the input shaft 80 via a direction-changing power transmission mechanism 460. In this embodiment, the direction-changing power transmission mechanism 460 includes a bevel gear provided to the drive-side member 455a, and an intermediate bevel gear 463 relatively non-rotatably supported on the input shaft 80 in meshed engagement with the bevel gear. In this embodiment, the drive-side gear 91, which is relatively non-rotatably supported on the input shaft 80, is arranged to be meshed with the first gear 61, which is relatively non-rotatably supported on the first pump shaft 10a, so that the input shaft 80 and the first pump shaft 10a are operatively connected to each other via the drive-side gear 91 and the first gear 61.

The pump case 430 is a modified form resulting from a partial modification of the pump case 30 in order to accommodate the PTO unit 450. That is, as best illustrated in FIGS. 9 and 10, a case body 431 in the pump case 430 has an intermediate wall 431d, which extends from the peripheral wall 31c towards an opposite side to the hydraulic-pump-body-accommodation space 30A. The intermediate wall 431d and the lid member 32 together act as a bearing of the input shaft 80. In this embodiment, the second opening 30b, through which the hydraulic clutch mechanism 455 can pass, is located above the intermediate wall 431d (see FIG. 10).

The pump case 430 in this embodiment includes a seal cap 433 connected to a bottom of the case body 431, in place of the seal plate 33. In this embodiment, a pressurized-fluid supply line to the hydraulic clutch mechanism 455 and the hydraulic brake mechanism 58 (the clutch line 326 and the brake line 327) is formed in the case body 431 (see FIG. 11). The operating fluid line 322, which extends through the switching valve 360 located in the charge pump unit 70, is connected to the pressurized-fluid supply line via conduit (not shown).

Figure 12:
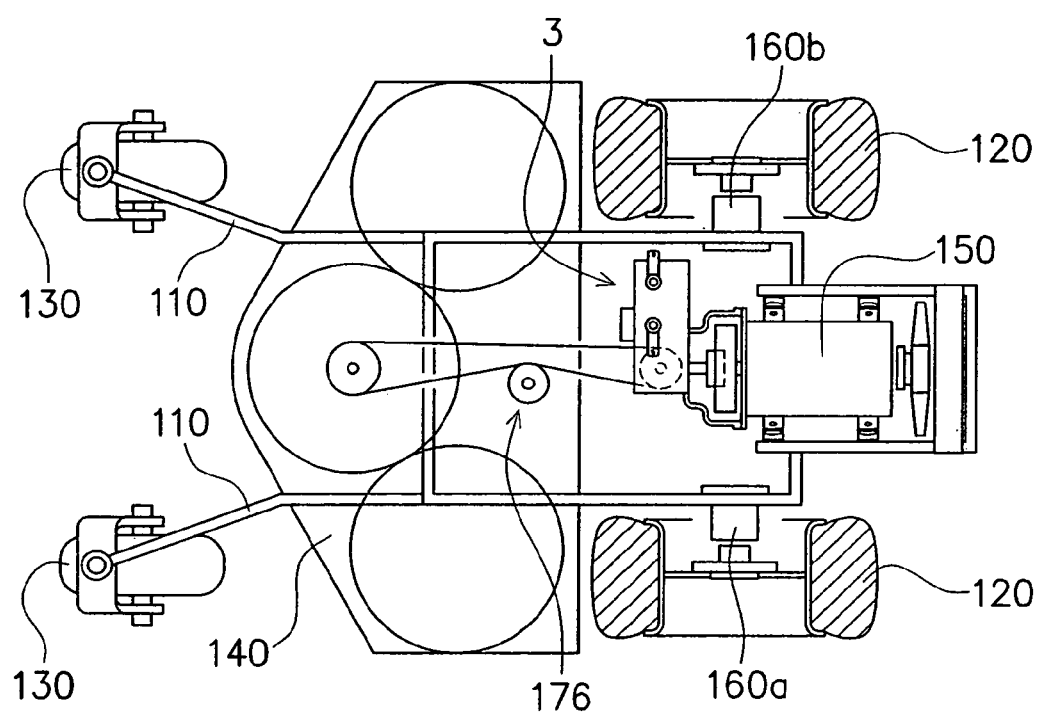
FIG. 12 is a plan view of the lawn mower, to which the pump unit according to a modified example of the third embodiment has been applied.
Figure 13:
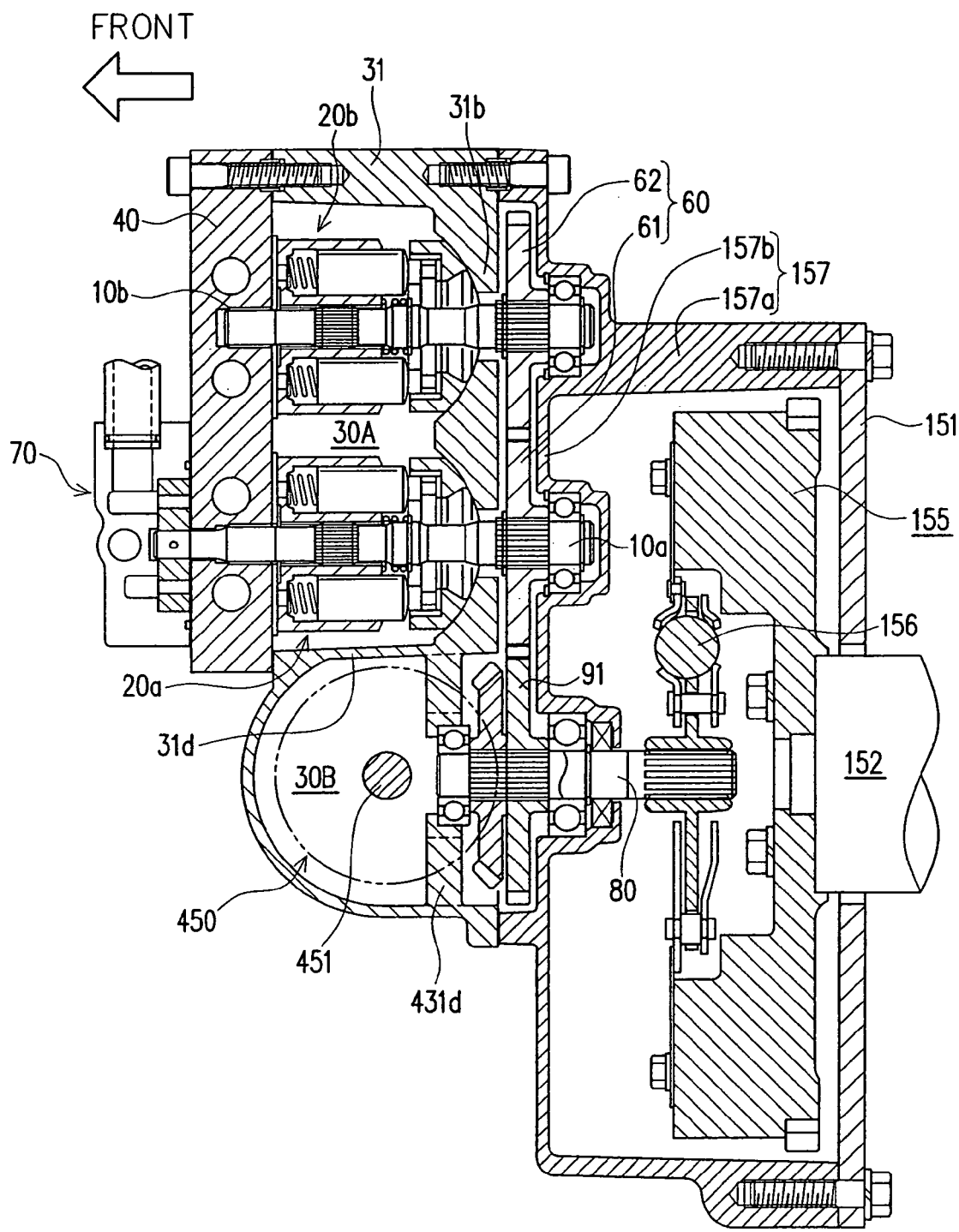
FIG. 13 is a plan view in horizontal cross section of the pump unit according to the modified example of the third embodiment.

The same effects as those in the first embodiment can also be produced in this embodiment. Although the pump case 430 is fixedly supported on the vehicle frame 110 with a distance away from the driving source 150 in this embodiment. Alternatively, the pump case 430 can be integrally connected to the driving source 150 in the same manner as in the second embodiment (see FIGS. 12 and 13). While the above embodiments were described by taking for example the case where the pump unit is operated in association with the driving source 150 of a horizontal type, which has a horizontally extending output shaft, the pump unit in each embodiment can be designed to be capable of being operated in association with a driving source of a vertical type, which has a vertically extending output shaft.

Fourth Embodiment

Figure 14A:
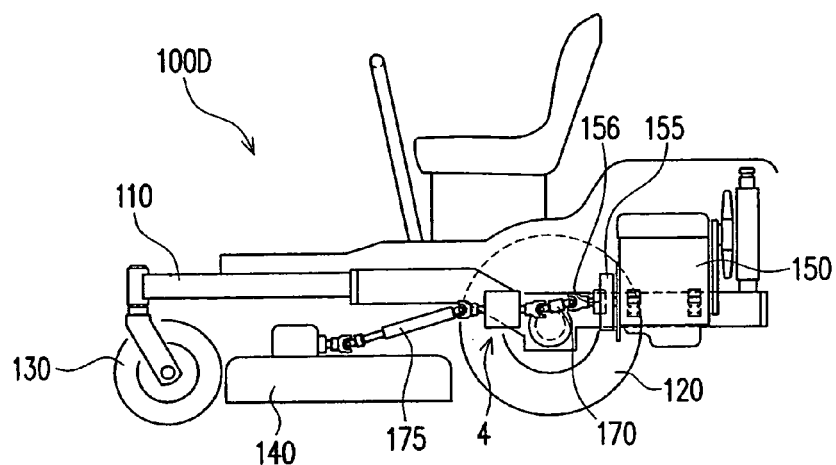
FIGS. 14A and 14B are a side view and a plan view of the lawn mower, to which the pump unit of a fourth embodiment of the present invention has been applied.
Figure 14B:
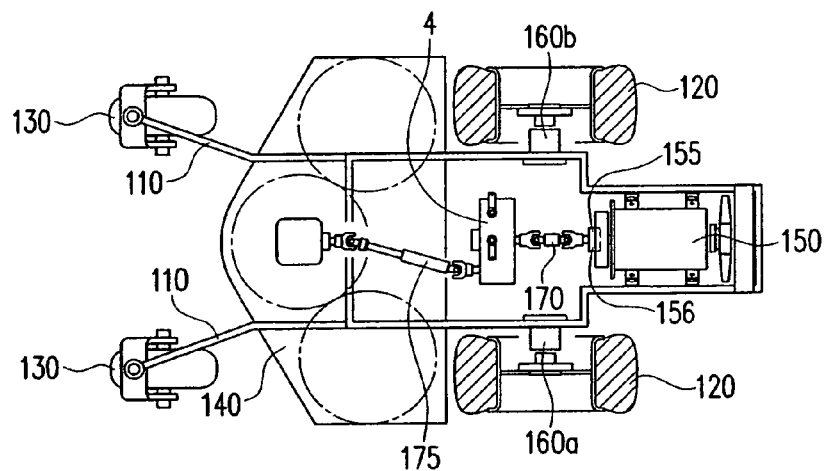
Figure 15:
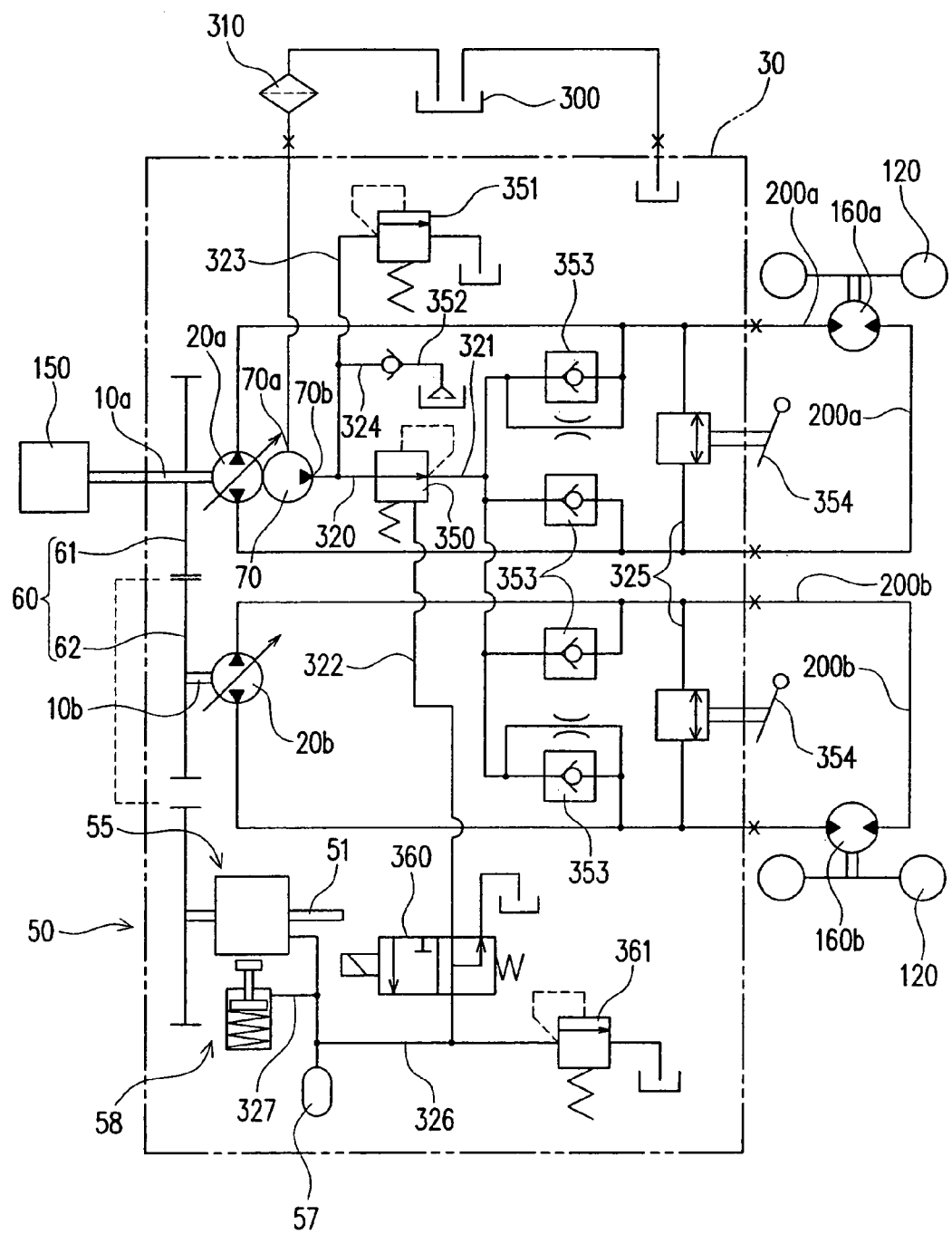
FIG. 15 is a hydraulic circuit diagram of the pump unit of the fourth embodiment.
Figure 16:
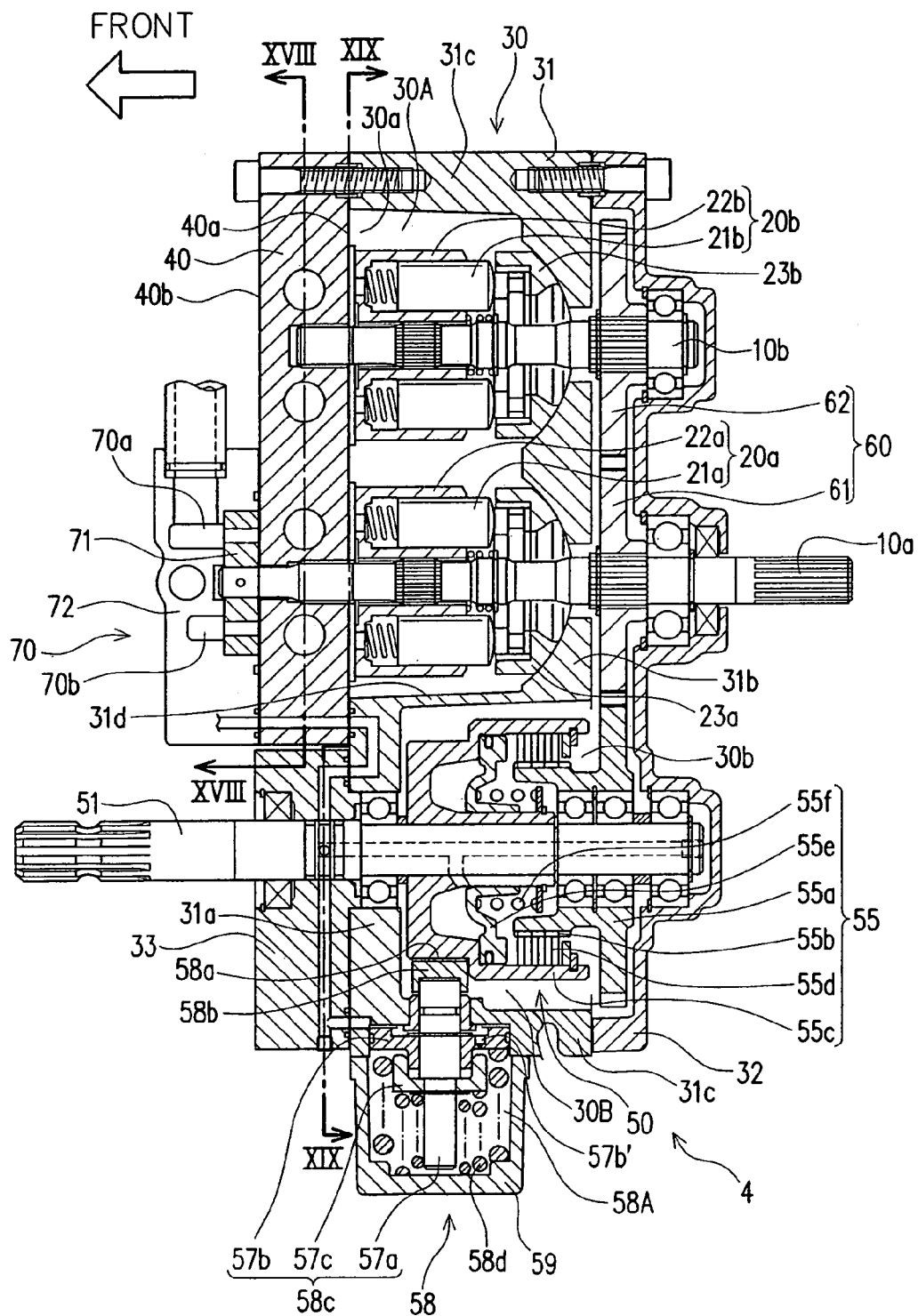
FIG. 16 is a plan view in horizontal cross section of the pump unit according to the fourth embodiment.
Figure 17:
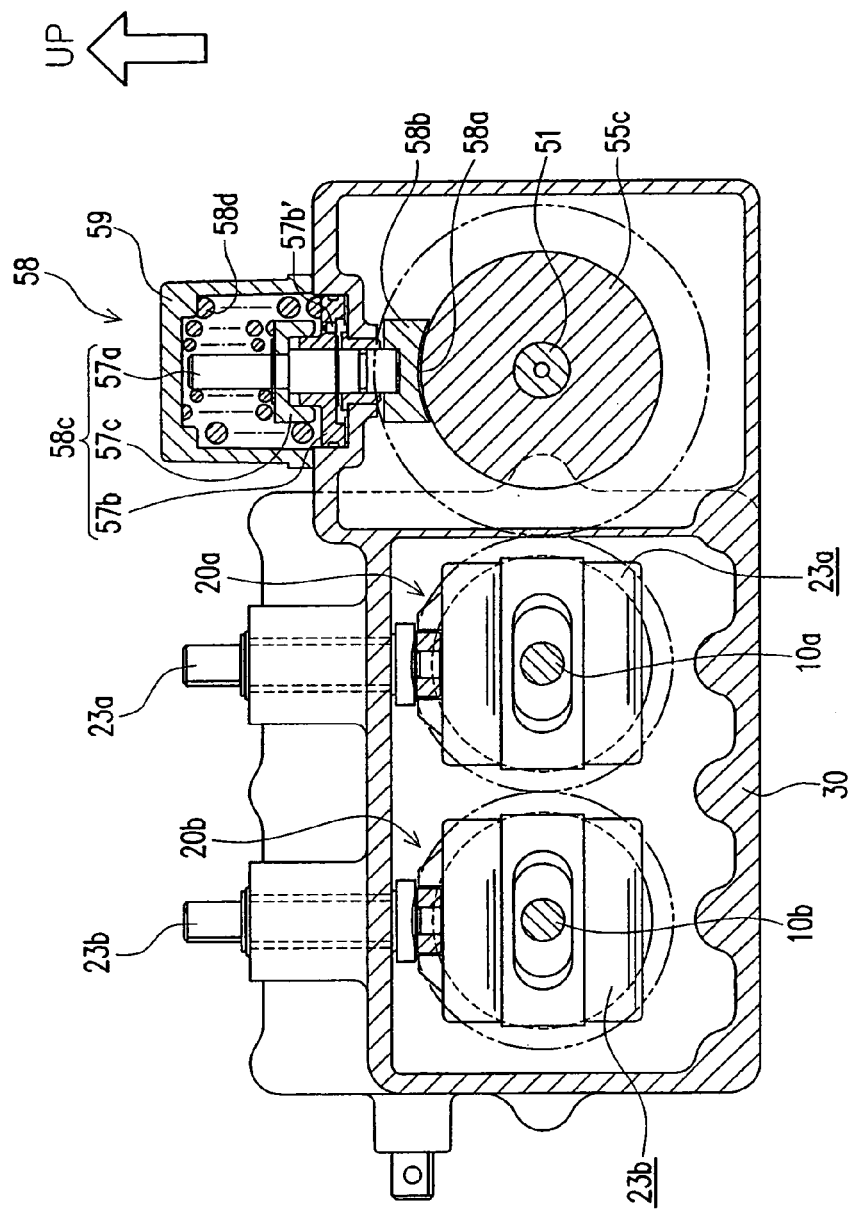
FIG. 17 is a side view in vertical cross-section of the pump unit of FIG. 16.
Figure 18:
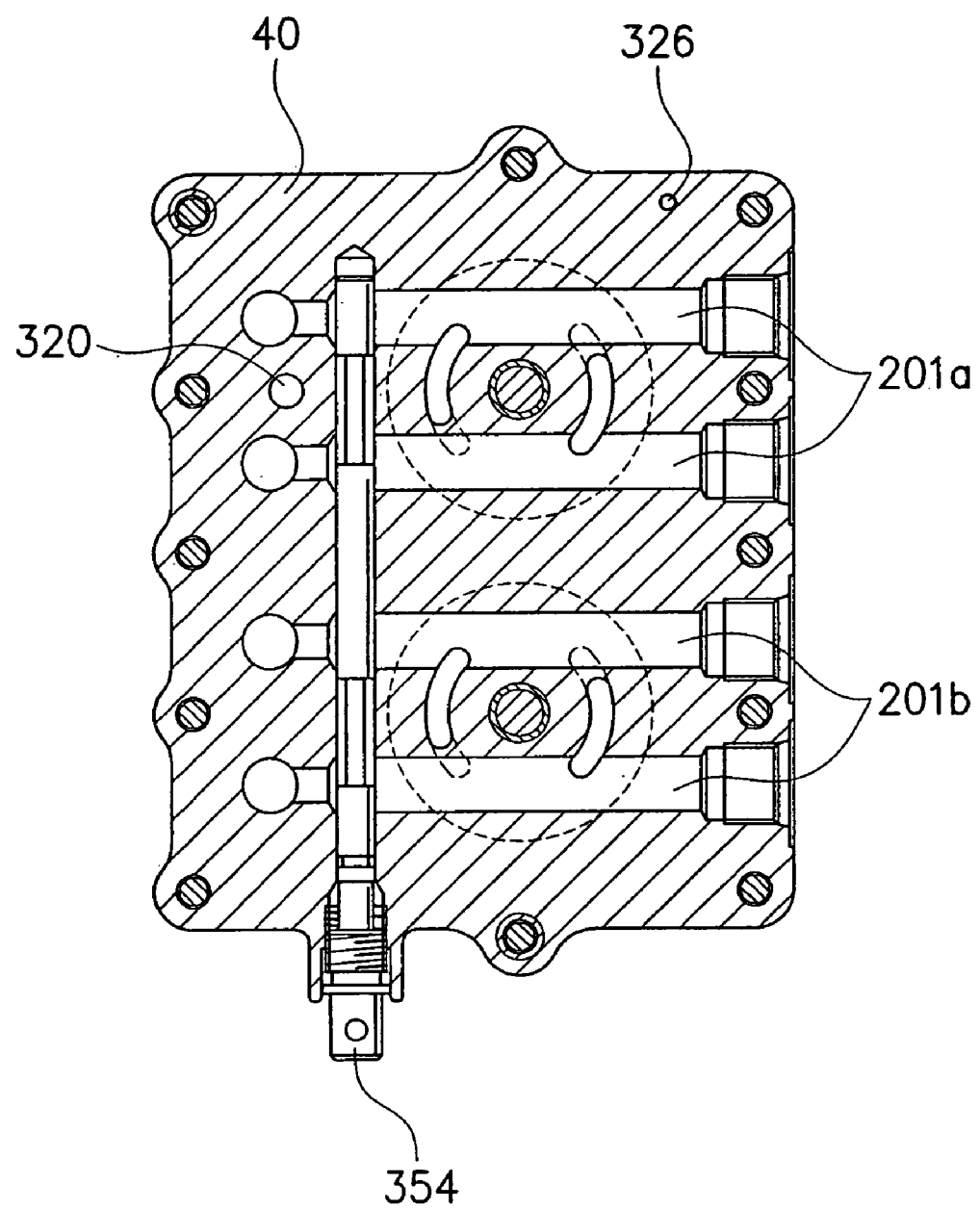
FIG. 18 is a cross section taken along the line XVIII—XVIII in FIG. 16.
Figure 19:
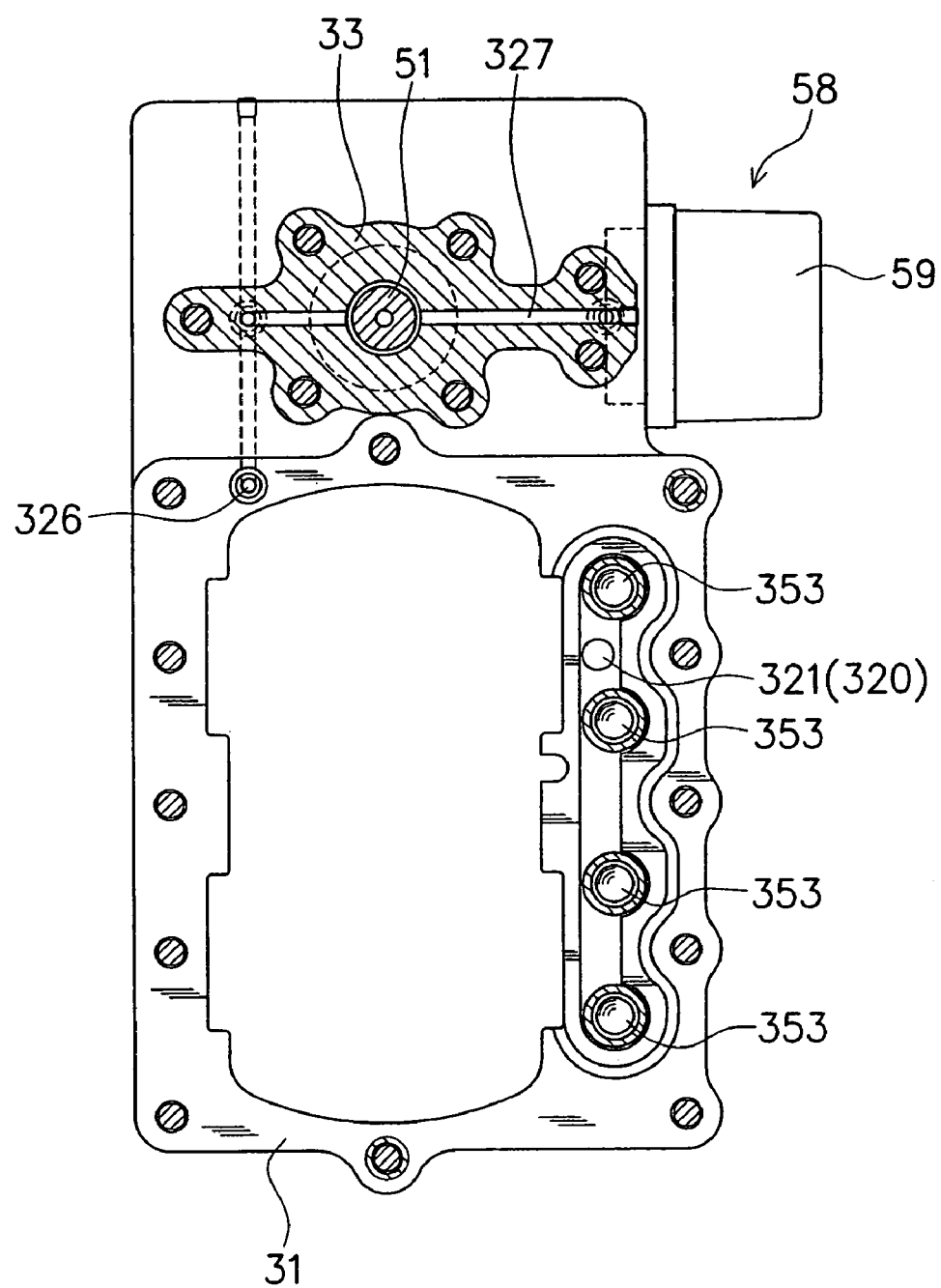
FIG. 19 is a cross section taken along the line XIX—XIX in FIG. 16.

The description will be made for the fourth embodiment of the present invention with reference to the accompanied drawings. FIGS. 14A and 14B are a side view and a plan view of a lawn mower 100D, to which a pump unit 4 of this embodiment has been applied. FIG. 15 is a hydraulic circuit diagram of the pump unit 4. FIGS. 16 and 17 are a plan view in horizontal cross section and a side view in vertical cross section of the pump unit 4 according to this embodiment. FIGS. 18 and 19 are cross sections respectively taken along the line XVIII—XVIII and XIX—XIX in FIG. 16. In the following description, corresponding or identical parts to those of the aforementioned embodiments have been given the same reference characters to omit a detailed description thereof.

The pump unit 4 of this embodiment is designed to omit the necessity to provide the input shaft 80 in the pump unit 1 of the first embodiment, and input driving power from the driving source 150 to the first pump shaft 10a.

That is, as illustrated in FIGS. 16 and 17, the pump unit 4 includes the first pump shaft 10a operatively connected to the driving source 150, the first hydraulic pump body 20a driven by the first pump shaft 10a, the second pump shaft 10b operatively connected to the first pump shaft 10a, the second hydraulic pump body 20b driven by the second pump shaft 10b, the pump case 30 having the first opening 30a, through which the first hydraulic pump body 20a and the second hydraulic pump body 20b can pass into and out of the pump case 30, the center section 40 connected to the pump case 30 so as to close the first opening 30a, while supporting the first and second hydraulic pump bodies 20a, 20b, and the PTO unit 50 accommodated in the center section 40.

As best illustrated in FIG. 16, the first pump shaft 10a is supported by the pump case 30 so as to have the upstream end (rear end in this embodiment) extending outwards through the pump case 30, and is operatively connected to the driving source 150 via the flywheel 155.

In this embodiment, in the same manner as the first embodiment, as illustrated in FIG. 14, the driving source 150 is supported on the vehicle frame 110 in vibration free manner, while the pump case 30 is fixedly supported on the vehicle frame 110. Accordingly, the driving source 150 and the first pump shaft 10a are operatively connected to each other via the vibration-absorbing transmission means.

The second pump shaft 10b is supported by the pump case 30 so as to be arranged substantially parallel to the first pump shaft 10a. In this embodiment, the second pump shaft 10b is operatively connected to the first pump shaft 10a via the transmission mechanism 60 placed in the pump case 30 so as to be rotated synchronously with the first pump shaft 10a. In this embodiment, the transmission mechanism 60 includes the first gear 61 relatively non-rotatably supported on the first pump shaft 10a, and the second gear 62 having the same pitch as the first gear 61 and relatively non-rotatably supported on the second pump shaft 10b so as to be in meshed engagement with the first gear 61.

The hydraulic clutch mechanism of the pump unit 4 of this embodiment is the same as that of the first embodiment, except that the power transmission from the first pump shaft 10a to the PTO shaft 51 is selectively enabled and disabled. That is, the hydraulic clutch mechanism 55 of this embodiment is the same as that of the first embodiment except that the drive-side member 55a is operatively connected not to the input shaft 80 but to the first pump shaft 10a.

The thus arranged hydraulic clutch mechanism 55 enables power transmission from the first pump shaft 10a to the PTO shaft 51 via the drive-side member 55a and the driven-side member 55c when the clutch pressing member 55e has brought the drive-side friction plate 55b and the driven-side friction plate 55d into frictional engagement with each other by the hydraulic effect, and disables power transmission from the first pump shaft 10a to the PTO shaft 51 when it is not subjected to the hydraulic effect.

The pump unit 4 of this embodiment has the pump case 30, which is the same as the pump case of the first embodiment except that the transmission mechanism 90 is not placed therein. That is, in this embodiment, an accommodation space between the lid member 32 and the second end wall 31b of the case body 31 is designed to accommodate only the transmission mechanism 60 for operative connection between the first pump shaft 10a and the second pump shaft 10b enabling them to be operated in association with each other.

Figure 20:
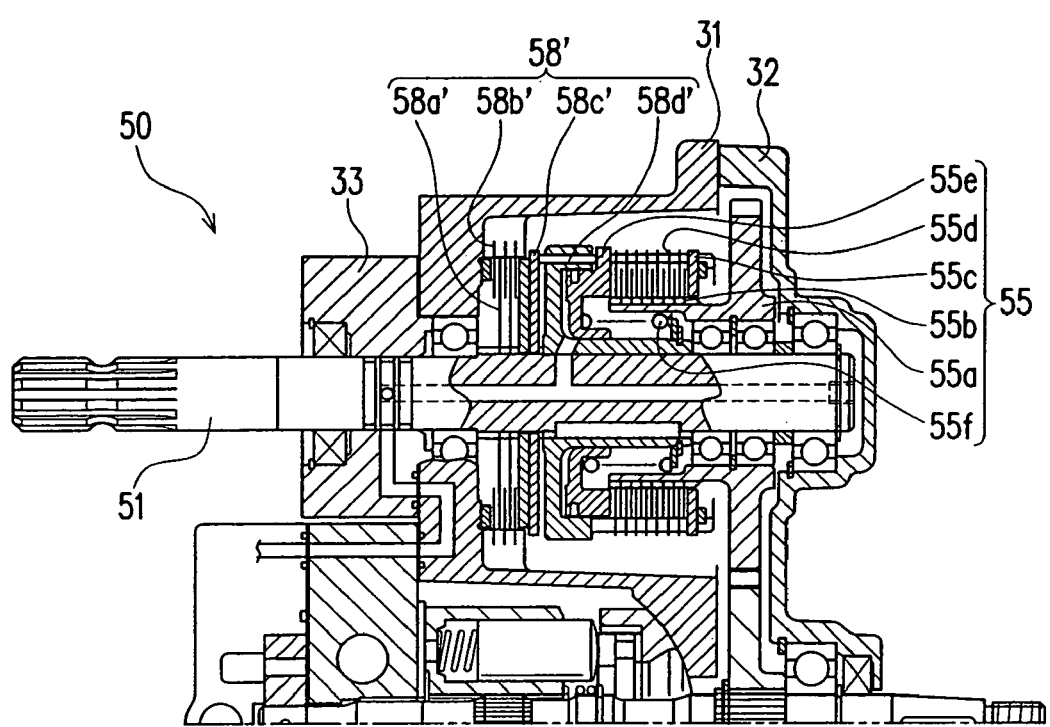
FIG. 20 is a plan view of the pump unit equipped with a hydraulic brake mechanism according to another embodiment with a part in horizontal cross section.

The pump unit 4 of this embodiment produces the same effects as those of the first embodiment. Also, in this embodiment, various modifications and replacements can be made in the same manner as those in the first embodiment. For example, as illustrated in FIG. 20, it is possible to provide the hydraulic brake mechanism 58' in place of the hydraulic brake mechanism 58 described in the first embodiment.

Figure 14C:
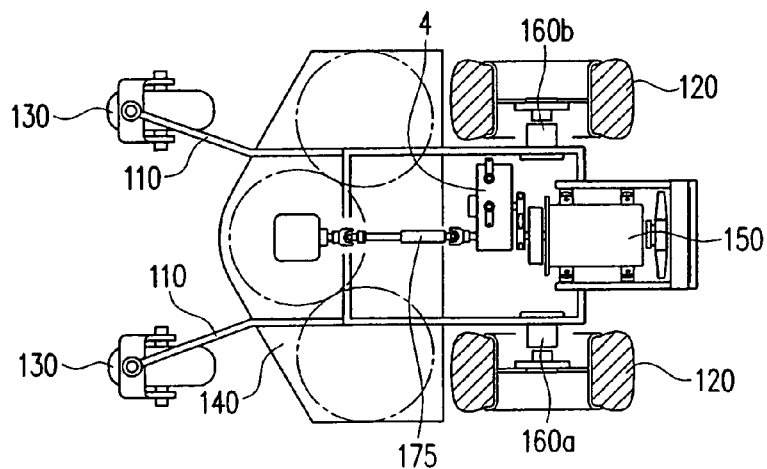
FIG. 14C is a plan view of the lawn mower, to which the pump unit according to a modified example of the fourth embodiment has been applied.

In this embodiment, as best illustrated in FIG. 14B, the first pump shaft 10a of the pump unit 4 and the output shaft of the driving source 150 are located along the longitudinal center axis of the vehicle. As a result, the PTO shaft 51 offset from the first pump shaft 10*a* to either side relative to the longitudinal center axis of the vehicle, and the input shaft of the working unit 140 located substantially along the longitudinal axis of the vehicle are offset from each other in the width direction of the vehicle. Alternatively to this arrangement, it is a matter of course to locate the PTO shaft 51 along the longitudinal center axis of the vehicle, as illustrated in FIG. 14C. Where the PTO shaft 51 is located substantially along the longitudinal center axis of the vehicle, the first pump shaft 10*a* is necessarily offset from the output shaft of the driving source 150 in the width direction of the vehicle. Therefore, in this arrangement, preferably, the first pump shaft 10*a* is operatively connected to the output shaft of the driving source 150 via a belt transmission mechanism.

Fifth Embodiment

Figure 21A:
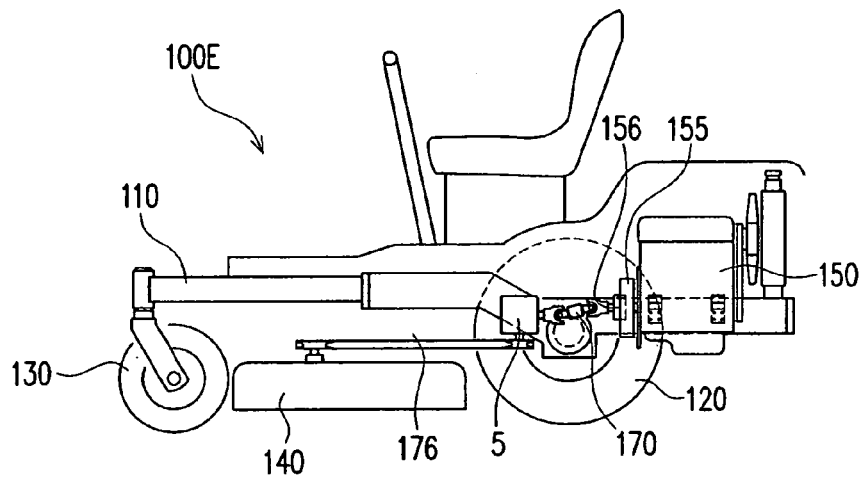
FIGS. 21A and 21B are a side view and a plan view of the lawn mower, to which the pump unit of a fifth embodiment of the present invention has been applied.
Figure 21B:
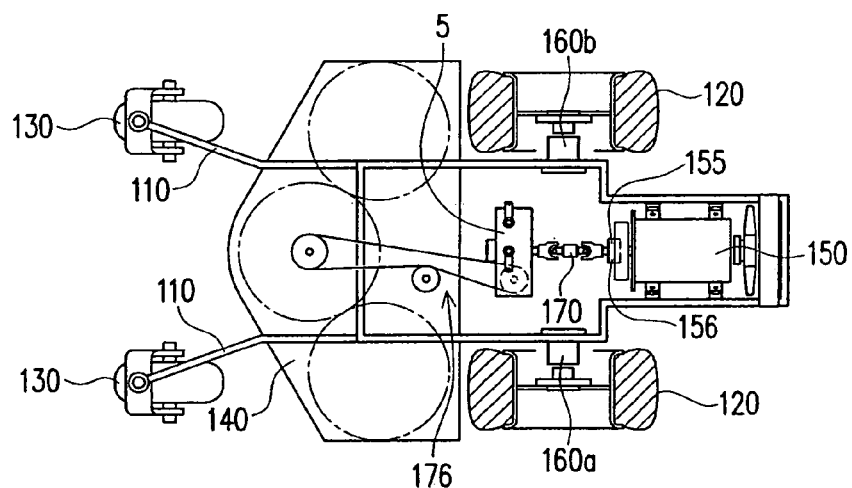
Figure 21C:
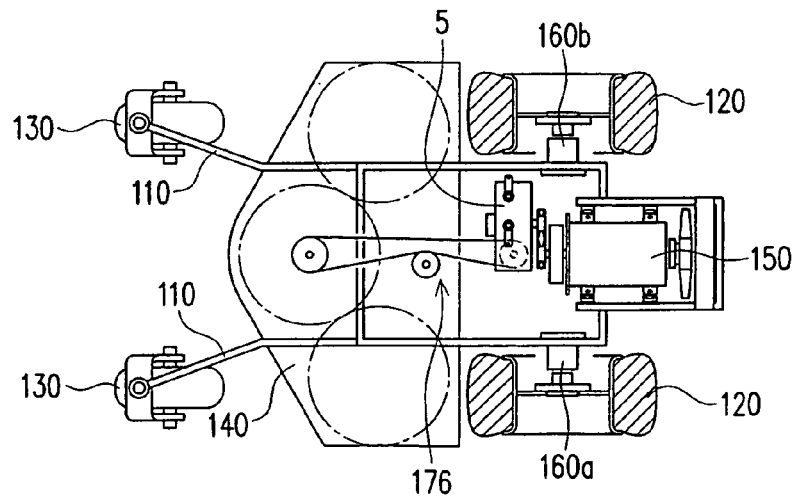
FIG. 21C is a plan view of the lawn mower, to which the pump unit according to a modified example of the fifth embodiment has been applied.
Figure 22:
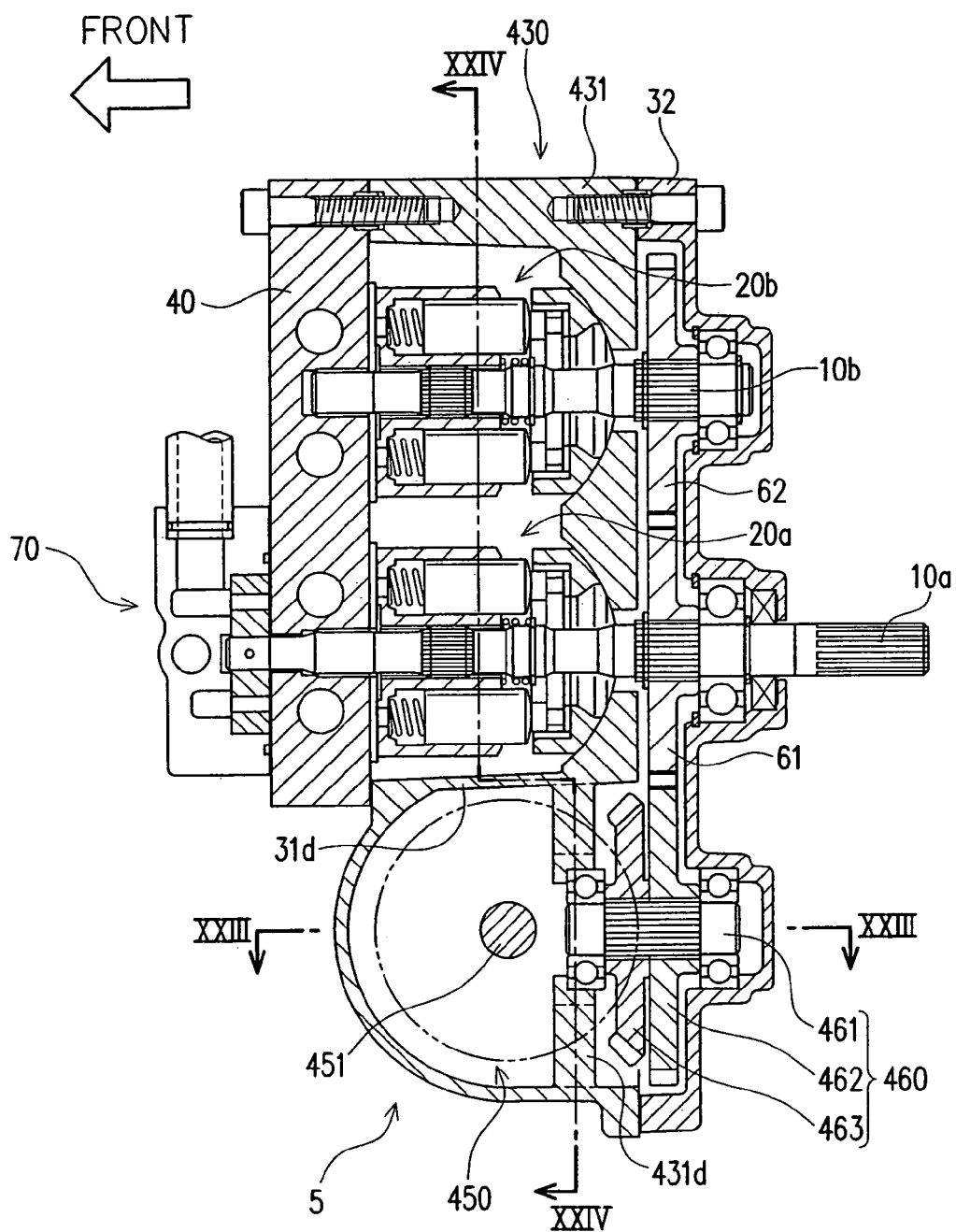
FIG. 22 is a plan view in horizontal cross section of the pump unit according to the fifth embodiment.
Figure 23:
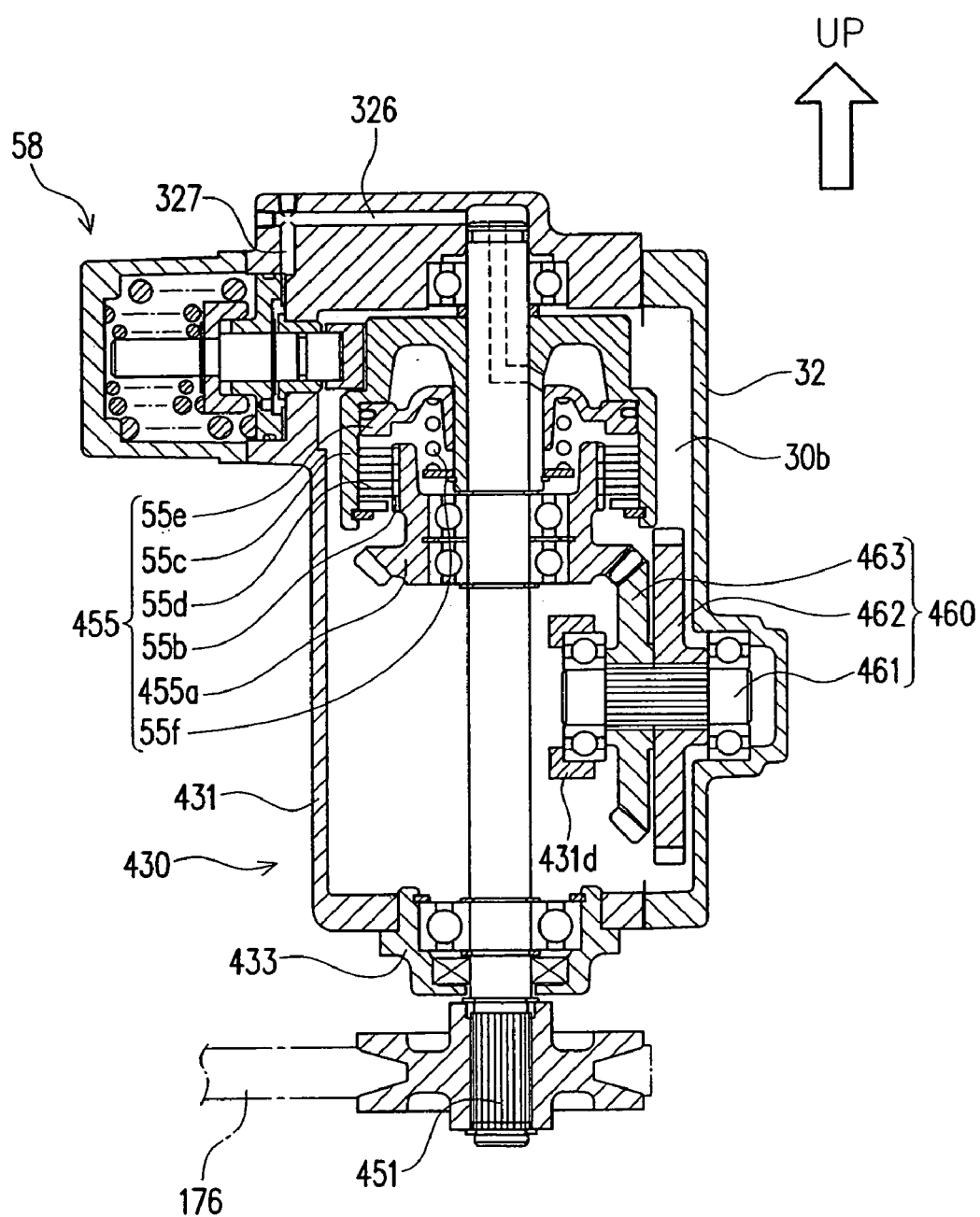
FIG. 23 is a cross section taken along the line XXIII—XXIII in FIG. 22.
Figure 24:
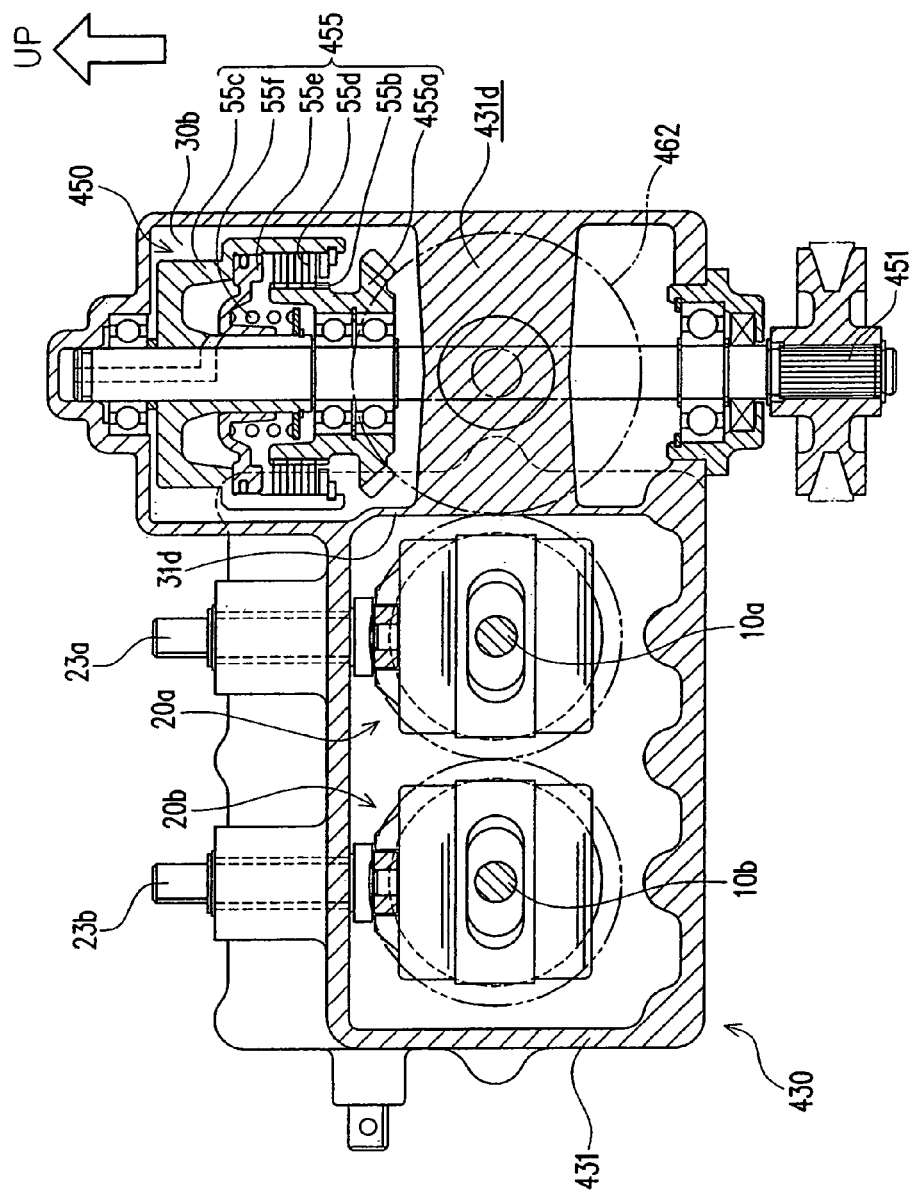
FIG. 24 is a cross section taken along the line XIV—XIV in FIG. 22.

The description will be made for the fifth embodiment of the present invention with reference to the accompanied drawings. FIGS. 21A and 21B are a side view and a plan view of a lawn mower 100E, to which a pump unit 5 of this embodiment has been applied. FIG. 21C is a plan view of the lawn mower, to which the pump unit according to a modified example of this embodiment has been applied. FIG. 22 is a plan view in horizontal cross section of the pump unit 5 according to this embodiment. FIGS. 23 and 24 are cross sections respectively taken along the line XXIII—XXIII and the line XXIV—XXIV in FIG. 22. In the following description, corresponding or identical parts to those of the aforementioned embodiment have been given the same reference characters to omit a detailed description thereof.

The pump unit 5 of this embodiment is modified so as to have the PTO shaft extending in the vertical direction in the pump unit 4 of the fourth embodiment. More specifically, the pump unit 5 of this embodiment has the PTO unit 450 and the pump case 430 of the fourth embodiment in the pump unit 4 of the fourth embodiment.

The thus arranged pump unit 5 can produce the same effects as those in the pump unit 4 of the fourth embodiment.

It is a matter of course that the pump unit 5 can be supported on the vehicle frame 110 so as to have the PTO shaft 451 placed substantially in the middle of the width of the vehicle, instead of having the pump unit 5 supported on the vehicle frame 110 so as to have the first pump shaft 10*a* placed in the same position as the longitudinal center axis of the vehicle in the vehicle width direction (see FIG. 21C).

Sixth Embodiment

Figure 25A:
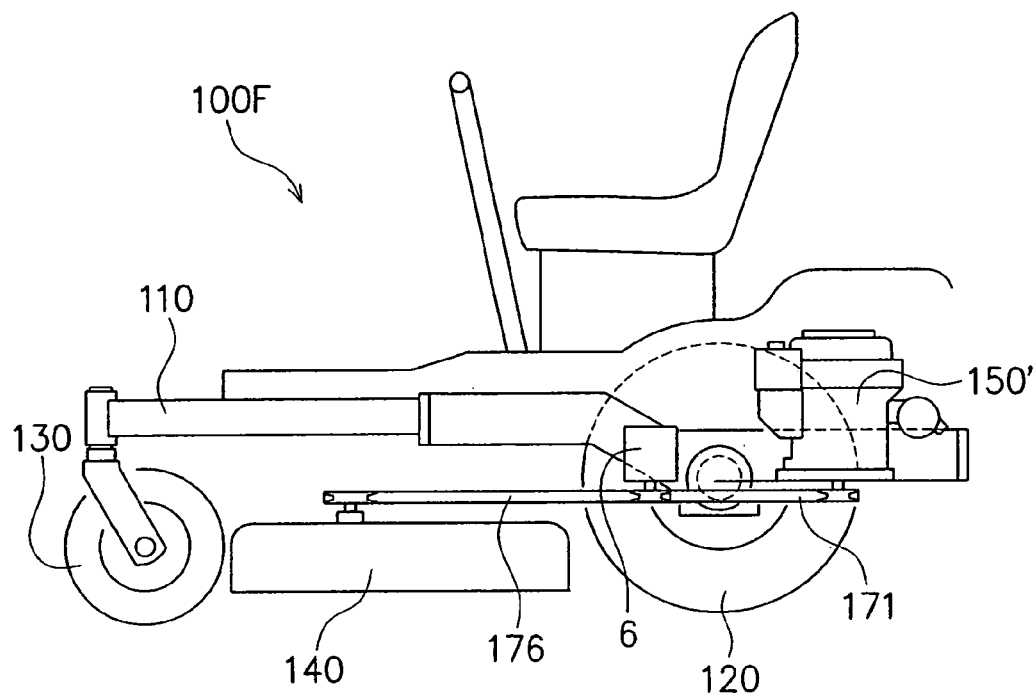
FIGS. 25A and 25B are a side view and a plan view of the lawn mower, to which the pump unit of a sixth embodiment of the present invention has been applied.
Figure 25B:
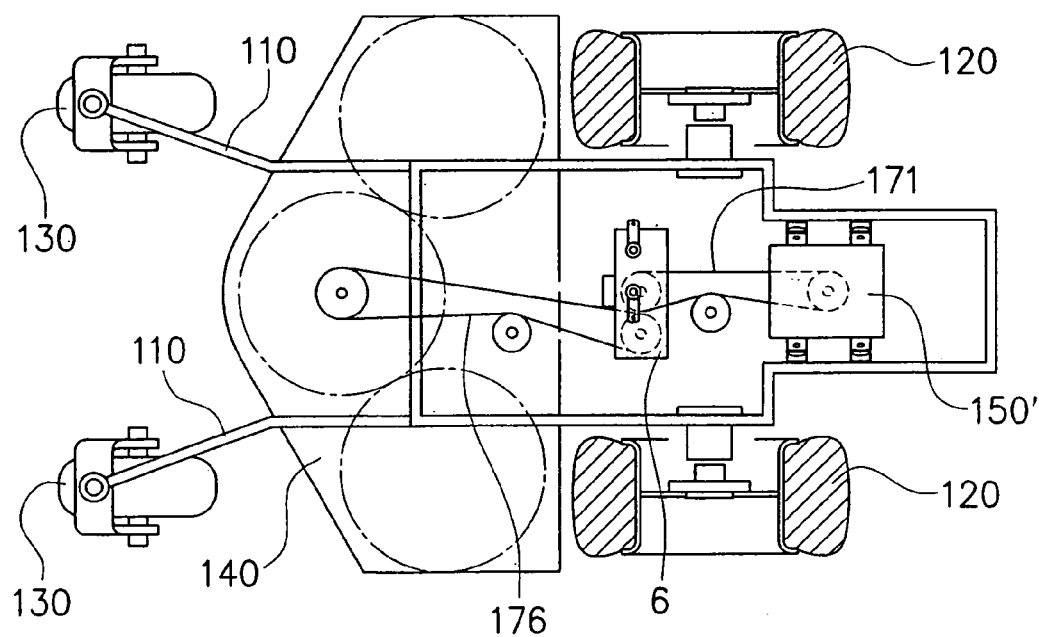

The description will be made for the sixth embodiment of the present invention with reference to the accompanied drawings. FIGS. 25A and 25B are a side view and a plan view of a lawn mower 100F, to which a pump unit 6 of this embodiment has been applied. FIG. 26 is a side view in vertical cross section of the pump unit 6 according to this embodiment. In the following description, corresponding or identical parts to those of the aforementioned embodiments have been given the same reference characters to omit a detailed description thereof.

While the pump units 4, 5 of the fourth and fifth embodiments each are designed to be operated in association with the driving source 150, which is a horizontal type that has the horizontally extending output shaft, the pump unit 6 of the sixth embodiment is designed to be operated in association with the driving source 150', which is a vertical type that has the vertically extending output shaft.

Specifically, as illustrated in FIG. 26, the first pump shaft 10*a* is extended in the vertical direction. In this embodiment, the first pump shaft 10*a* has a lower end extending downwards from a pump case 530 and operatively connected to the driving source 150' via a belt transmission mechanism 171.

The pump case 530 is the same in construction as the pump case 30 in the fourth embodiment, except that the pump case 530 is oriented in a different direction. That is, the pump case 530 is fixed to the vehicle frame 110 so as to have the first and second end walls 31*a*, 31*b* upwardly and downwardly oriented in the vertical direction.

The PTO shaft 51 is supported by the pump case 530 so as to extend substantially parallel to the first pump shaft 10*a*, and has a lower extension, which extends downwards from the pump case 430. In this embodiment, the lower extension of the PTO shaft 51 is operatively connected to the working unit 140 via the belt transmission mechanism 176.

In the thus arranged sixth embodiment, the same effects as those of the fourth and fifth embodiments can be produced. While the PTO shaft 51 is arranged so as to extend in the vertical direction in this embodiment, it is a matter of course that the PTO shaft 51 can be arranged so as to extend in the fore and aft direction of the vehicle. In this arrangement, the direction-changing power transmission mechanism 460 as described in the third embodiment is provided. In this embodiment, the output shaft of the driving source 150' and the first pump shaft 10*a* are arranged substantially along the longitudinal center axis of the vehicle (see FIG. 25B). Alternative to this, the PTO shaft 51 may be arranged substantially in the middle of the width of the vehicle.

Seventh Embodiment

Figure 27:
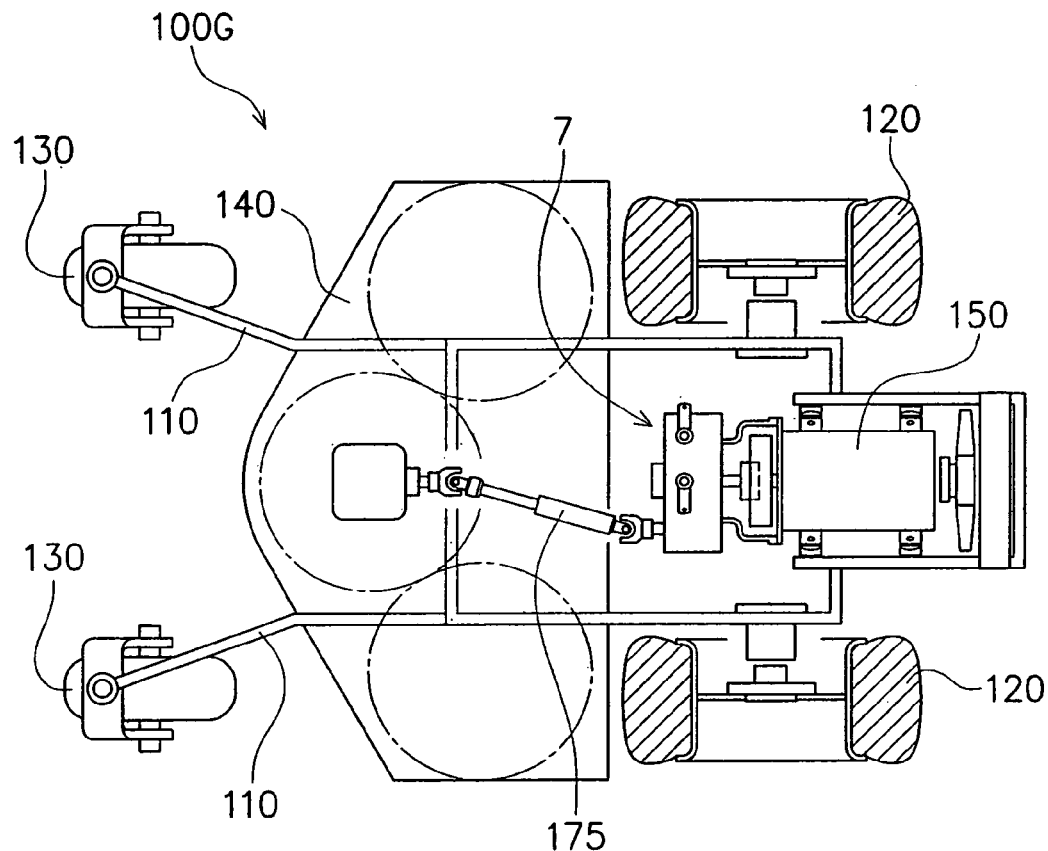
FIG. 27 is a plan view of the lawn mower, to which the pump unit of a seventh embodiment of the present invention has been applied.
Figure 28:
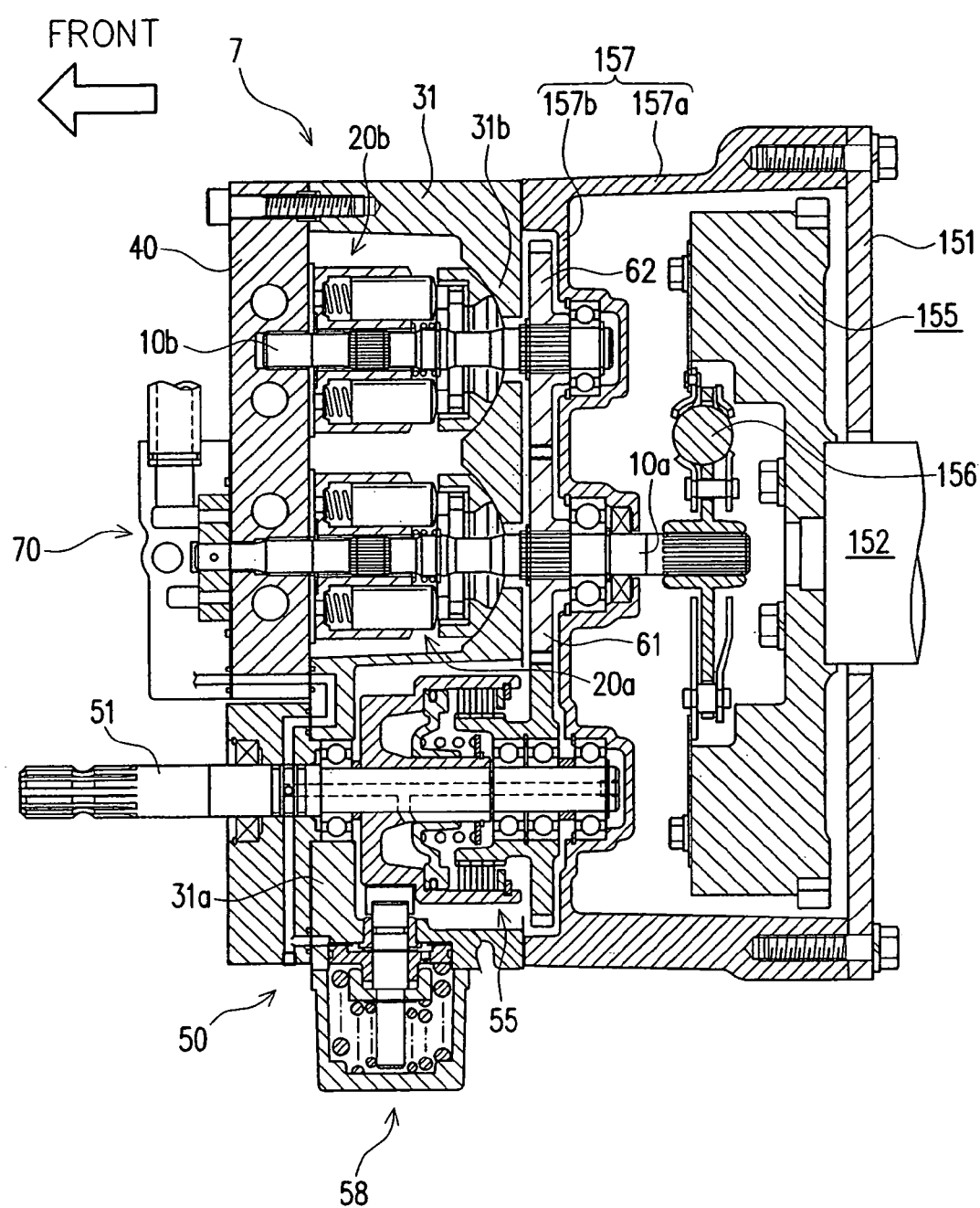
FIG. 28 is a plan view in horizontal cross section of the pump unit according to the seventh embodiment of the present invention.
Figure 29:
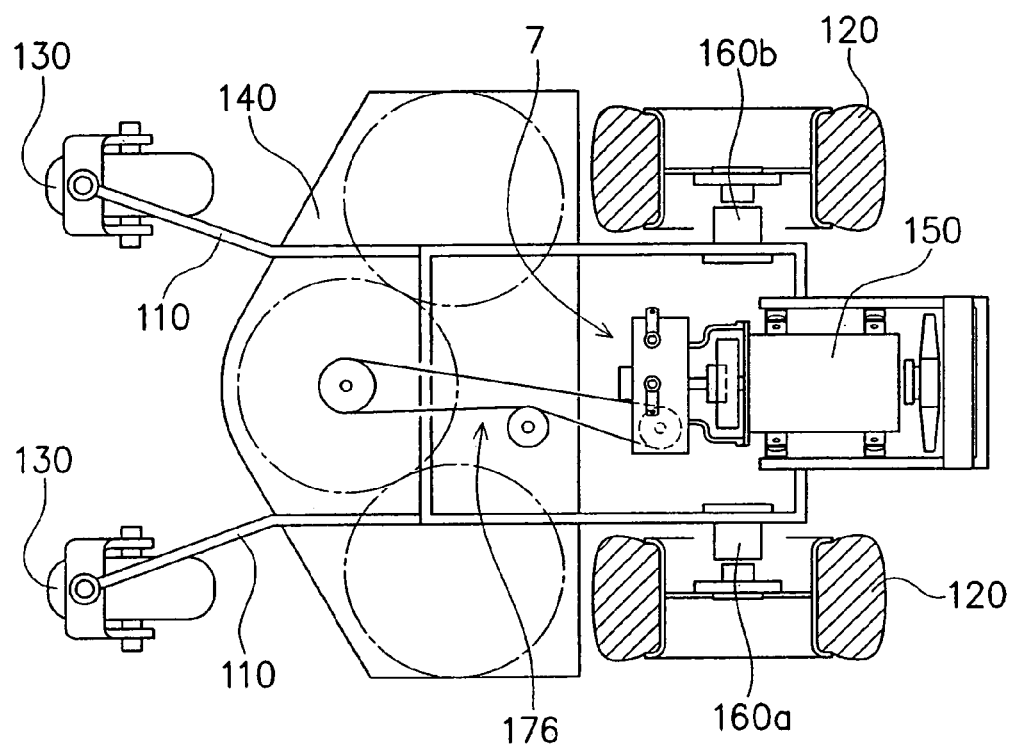
FIG. 29 is a plan view of the lawn mower, to which the pump unit of a modified example of the seventh embodiment has been applied.
Figure 30:
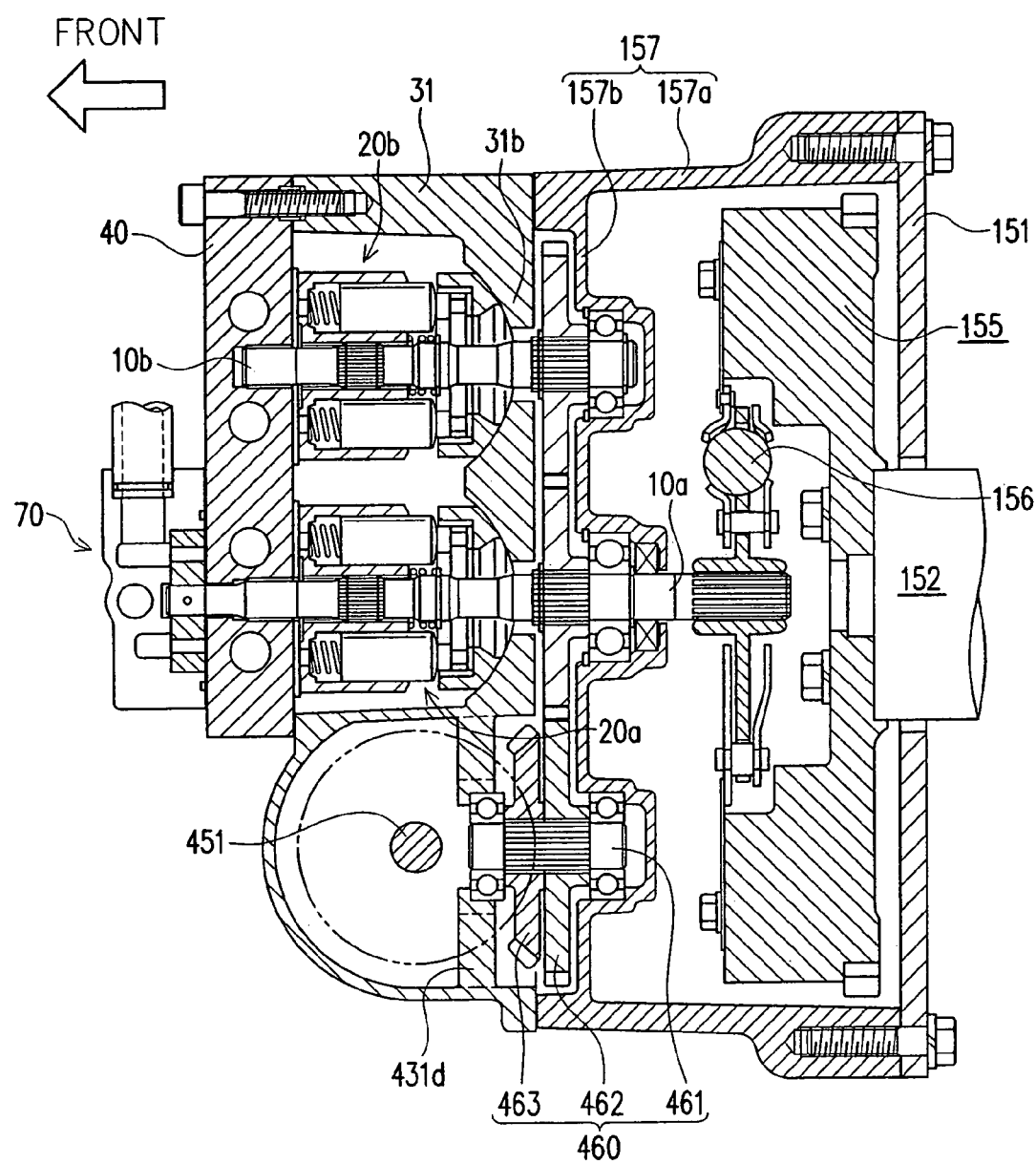
FIG. 30 is a plan view in horizontal cross section of the pump unit according to the seventh embodiment.

The description will be made for the seventh embodiment of the present invention with reference to the accompanied drawings. FIG. 27 is a plan view of a lawn mower 100G, to which a pump unit 7 of this embodiment has been applied. FIG. 28 is a plan view in horizontal cross section of the pump unit 7 according to this embodiment. In the following description, corresponding or identical parts to those of the aforementioned embodiments have been given the same reference characters to omit a detailed description thereof.

The pump unit 7 of this embodiment has been conceived based upon the concept of integral connection between the pump unit and the driving source as described in the second embodiment, which is applied to the pump unit arrangement in each of the fourth to sixth embodiments.

With the thus arranged pump unit 7, the same effects as those in the second embodiment, as well as the same effects as those in the fourth and fifth embodiments can be produced. While this embodiment has been described by taking for example the case where the PTO shaft 51 is arranged so as to be substantially parallel to the first pump shaft 10*a*, a PTO shaft 451, which extends substantially orthogonal to the first pump shaft 10*a*, may be provided.

Further, this embodiment has been described by taking for example the case where the pump unit is integrally connected to the driving source 150 of the horizontal type. However, it is a matter of course that the pump unit is integrally connected to the driving source 150' of the vertical type.

This specification is by no means intended to restrict the present invention to the preferred embodiments set forth therein. Various modifications to the pump unit, as well as the working vehicle as described herein, may be made by those skilled in the art without departing from the spirit and scope of the present invention as defined in the appended claims.

What is claimed is:

1. A pump unit for supply and discharge of hydraulic fluid into and from a motor unit upon receiving driving power from a driving source, said motor unit being accommodated outside said pump unit so as to be located away from said pump unit and fluidly connected to said pump unit via a hydraulic circuit, comprising:
   an input member operatively connected to said driving source;
   a first hydraulic pump body operatively connected to said input member, said first hydraulic pump body being of a variable displacement type;
   a pump case for accommodating said first hydraulic pump body and forming a hydraulic fluid sump;
   fluid connection ports disposed on an outside surface of said pump case for fluidly connecting said first hydraulic pump body with a hydraulic motor body of said motor unit; and
   a PTO unit accommodated within said pump case,
   said PTO unit comprising:
      a PTO shaft supported by said pump case so as to have an end extending outward from said pump case; and
      a clutch mechanism for selectively enabling and disabling transmission of driving power from said input member to said PTO shaft,
      wherein said pump case includes a hollow case body having a first end wall with a first opening through which said first hydraulic pump body can pass, a second end wall with a second opening through which said clutch mechanism can pass, said second end wall being disposed away from said first end wall along an axial direction of said input member, and a peripheral wall extending between peripheral edges of said first end wall and said second end wall,
      a center section connected to said case body so as to close said first opening, said center section supporting said first hydraulic pump body on one of opposite sides thereof and forming said hydraulic circuit, and
      a lid member connected to said case body so as to close said second opening, and
      wherein said case body further includes a partition wall for dividing an inner space defined by said case body, said center section and said lid member into a hydraulic-pump-body-accommodation space for accommodating said first hydraulic pump body and a hydraulic-clutch-mechanism-accommodation space for accommodating said clutch mechanism.

2. A pump unit for supply and discharge of hydraulic fluid into and from a motor unit upon receiving driving power from a driving source, said motor unit being accommodated outside said pump unit so as to be located away from said pump unit and fluidly connected to said pump unit via a hydraulic circuit, comprising:
   an input member operatively connected to said driving source;
   a first hydraulic pump body operatively connected to said input member, said first hydraulic pump body being of a variable displacement type;
   a pump case for accommodating said first hydraulic pump body and forming a hydraulic fluid sump;
   fluid connection ports disposed on an outside surface of said pump case for fluidly connecting said first hydraulic pump body with a hydraulic motor body of said motor unit; and
   a PTO unit accommodated within said pump case,
   said PTO unit comprising:
      a PTO shaft supported by said pump case so as to have an end extending outward from said pump case; and
      a clutch mechanism for selectively enabling and disabling transmission of driving power from said input member to said PTO shaft,
      wherein said driving source is supported on a vehicle frame so as to be capable of vibrating with respect to said vehicle frame, and
      wherein said pump case is supported by said driving source in a state of having no direct connection with the vehicle frame.

* * * * *